(12) United States Patent
Noma

(10) Patent No.: US 9,832,293 B2
(45) Date of Patent: Nov. 28, 2017

(54) AUDIO TRANSMISSION DEVICE WITH DISPLAY FUNCTION

(71) Applicant: Sharp Kabushiki Kaisha, Osaka (JP)

(72) Inventor: Mikihiro Noma, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 15/316,753

(22) PCT Filed: Jun. 3, 2015

(86) PCT No.: PCT/JP2015/066001
§ 371 (c)(1),
(2) Date: Dec. 6, 2016

(87) PCT Pub. No.: WO2015/190360
PCT Pub. Date: Dec. 17, 2015

(65) Prior Publication Data
US 2017/0163778 A1 Jun. 8, 2017

(30) Foreign Application Priority Data

Jun. 10, 2014 (JP) ................................. 2014-119644

(51) Int. Cl.
H04B 1/38 (2015.01)
H04M 1/02 (2006.01)
H04R 1/46 (2006.01)

(52) U.S. Cl.
CPC ............ *H04M 1/0202* (2013.01); *H04R 1/46* (2013.01); *H04R 2460/13* (2013.01); *H04R 2499/15* (2013.01)

(58) Field of Classification Search
CPC .. H04R 2460/13; H04R 2499/11; H04R 1/46; H04R 3/02; H04R 2460/03; H04R 13/02;
(Continued)

(56) References Cited

U.S. PATENT DOCUMENTS 6,912,287 B1    6/2005  Fukumoto et al.
2006/0218215 A1*  9/2006  Ohashi .................... H04B 3/23
                                                     708/300
(Continued)

FOREIGN PATENT DOCUMENTS

JP    2000-322186 A    11/2000
JP    2006-11591 A     1/2006
(Continued)

*Primary Examiner* — Golam Sorowar
(74) *Attorney, Agent, or Firm* — Chen Yoshimura LLP

(57) ABSTRACT

A smartphone comprising: a liquid crystal panel having a display surface having a quadrangular display area defined therein; a cover panel; an input unit disposed so as to be located outside the display area such that one side section included in four side sections defining the display area is located between the input unit and the display area, the input unit converting input bone conduction sound transmitted through the cover panel into an input signal; and an output unit disposed so as to be located outside the display area such that the one side section included in the four side sections defining the display area and located between the display area and the input unit is located between the output unit and the display area, the output unit converting an output signal and transmitting the same as output bone conduction sound to the cover panel.

7 Claims, 11 Drawing Sheets

(58) Field of Classification Search
CPC ........ H04R 1/02; H04R 1/06; H04R 2410/05; H04R 25/407; H04R 25/45; H04M 1/0266; H04M 1/0281; H04M 1/03; H04M 1/035; H04M 1/05; H04M 1/605; H04M 1/72591; H04M 2250/12; H04M 9/082

See application file for complete search history.

(56) References Cited

U.S. PATENT DOCUMENTS

| | | | |
|---|---|---|---|
| 2010/0172519 A1 | 7/2010 | Kimura | |
| 2013/0156233 A1* | 6/2013 | Joo | H04M 1/0266 381/151 |
| 2014/0363008 A1* | 12/2014 | Chen | G10K 11/002 381/66 |
| 2014/0364171 A1* | 12/2014 | Heiman | H04M 1/605 455/566 |
| 2015/0289052 A1* | 10/2015 | Takeda | H04R 1/02 381/151 |

FOREIGN PATENT DOCUMENTS

| | | |
|---|---|---|
| JP | 2010-157974 A | 7/2010 |
| JP | 2012-138770 A | 7/2012 |

\* cited by examiner

AUDIO TRANSMISSION DEVICE WITH DISPLAY FUNCTION

TECHNICAL FIELD

The present invention relates to an audio transmission device with a display function.

BACKGROUND ART

A mobile telephone disclosed in Patent Document 1 has a configuration in which a transmitter unit such as a microphone that picks up sound emitted from an operator's mouth is provided in a lower area of the mobile telephone and a receiver unit such as an earphone that transmits sound to the operator's ear is provided in an upper area of the mobile telephone, and furthermore, a right-ear vibration unit and a left-ear vibration unit that make contact with the operator's tragus to enable audio reception through bone conduction over the cartilage of the tragus is provided in an upper area of the mobile telephone.

RELATED ART DOCUMENT

Patent Document

Patent Document 1: Japanese Patent Application Laid-Open Publication No. 2012-138770

SUMMARY OF THE INVENTION

Problems to be Solved by the Invention

In the above-described Patent Document 1, the configuration is such that the receiver unit and the vibration units are provided in an upper area of the mobile telephone and the transmitter unit is provided in a lower area of the phone, distanced from each other. When such an arrangement is employed, however, installation spaces for installing the various components are necessary in the upper and lower areas of the mobile telephone, which has made it difficult to narrow the bezel on the upper and lower areas. There has thus been a risk that the designability of the device will suffer.

Having been accomplished in light of the above-described circumstances, it is an object of the present invention to achieve a narrower bezel.

Means for Solving the Problems

An audio transmission device with a display function according to the present invention includes: a display component having a display surface in which is defined a quadrangular display area where an image is displayed; an outer panel disposed so as to cover the display surface of the display component; an input unit disposed outside the display area, the input unit receiving and converting input air conduction sound transmitted through outside air into an input signal, or receiving and converting input bone conduction sound transmitted through the outer panel into an input signal; and a bone conduction sound output unit disposed outside the display area on a same side as the input unit among four sides surrounding the display area, the bone conduction sound output unit converting an output signal and transmitting the output signal as output bone conduction sound to the outer panel.

According to this configuration, during a voice call, a user makes direct contact with the outer panel disposed so as to cover the display surface of the display component, and thus the output bone conduction sound obtained by the bone conduction sound output unit converting the output signal is transmitted through the outer panel. The output bone conduction sound can thus be conducted through bone conduction to the user's inner ear and recognized as voice. Meanwhile, voice produced by the user during a voice call is transmitted through the outside air as the input air conduction sound or through the outer panel as the input bone conduction sound, is converted into an input signal by the input unit, and is inputted as voice.

The input unit and the bone conduction sound output unit are disposed in a consolidated manner outside the display area, such that the same one side section included in the four side sections defining the quadrangular display area in the display component that displays images is located between those units and the display area. Accordingly, spaces outside the display area that have the other three side sections located between those spaces and the display area are reduced in size. This makes it possible to ensure a broader display area in the display surface of the display component, which is favorable in terms of narrowing the bezel. Additionally, disposing the input unit and the bone conduction sound output unit outside the display area makes it difficult for those units to interfere with images displayed in the display area.

The following configurations are preferable as embodiments of the present invention.

(1) The input unit is the bone conduction sound input unit that receives and converts the input bone conduction sound transmitted through the outer panel into an input signal. In the case where an air conduction sound input unit that converts input air conduction sound transmitted through outside air into an input signal is used as the input unit, it is necessary to provide an opening in the outer panel or the like for allowing the input air conduction sound to pass through. With respect to this point, using a bone conduction sound input unit for the input unit eliminates the need to provide such an opening in the outer panel or the like, which provides superior designability for the outer panel.

(2) The device further includes an output separating unit that obtains an output separated input signal based on the input bone conduction sound from which the output bone conduction sound has been separated, by finding a difference between the input signal obtained by the conversion performed by the bone conduction sound input unit and the output signal. For example, in the case where the output bone conduction sound and the input bone conduction sound are transmitted through the outer panel simultaneously, the input signal obtained from the conversion performed by the bone conduction sound input unit will contain the input bone conduction sound and the output bone conduction sound in a mixed state. Even in this case, by finding the difference between that input signal and the output signal, the output separating unit obtains the output separated input signal based on the input bone conduction sound from which the output bone conduction sound has been separated. This makes it possible to reliably extract the input bone conduction sound from the mixed sound and obtain clear voice input.

(3) The device further includes an output signal correcting unit that calculates a corrected output signal by multiplying the output signal by a correction coefficient, the correction coefficient being an inverse of an attenuation factor of attenuation arising when the output bone conduction sound is transmitted through the outer panel, and the output separating unit obtains the output separated input signal by finding a difference between the input signal and the corrected output signal. There are cases where attenuation arises when the output bone conduction sound is transmitted through the outer panel, and the output signal correcting unit can calculate the corrected output signal based on the substantial output bone conduction sound from which that attenuation has been eliminated. The corrected output signal calculated by the output signal correcting unit is used when the output separating unit finds the difference from the input signal, and thus the substantial output bone conduction sound can be reliably removed from the mixed sound by the output separating unit. This makes it possible to obtain an even clearer voice input.

(4) The output separating unit is constituted by a differential amplifier that finds a difference between the input signal and the output signal and amplifies the difference. As a result, by finding the difference between the input signal and the output signal and amplifying that difference using the differential amplifier serving as the output separating unit, clearer voice input can be obtained.

(5) The bone conduction sound input unit and the bone conduction sound output unit are each attached to a panel surface, of the outer panel, that faces the display component. As a result, input bone conduction sound transmitted through the outer panel can be reliably converted into an input signal by the bone conduction sound input unit attached to the panel surface, of the outer panel, that is on the display component side. The bone conduction sound output unit attached to the display component side panel surface of the outer panel converts output signals into output bone conduction sound and causes the outer panel to directly transmit that output bone conduction sound, which provides superior transmission efficiency. This makes it possible to reliably convert the input bone conduction sound into an input signal, and makes it possible to efficiently transmit output bone conduction sound, obtained by converting an output signal, to the user. As such, better voice call quality can be achieved.

(6) The input unit is the air conduction sound input unit that receives and converts input air conduction sound transmitted through outside air into an input signal. As a result, voice or the like produced by the user is transmitted through the outside air as the input air conduction sound and is converted into the input signal by the air conduction sound input unit, thus achieving input of that voice or the like. The air conduction sound input unit is, along with the bone conduction sound output unit, disposed outside the display area such that of the four side sections defining the display area, the one side section on the lower side in the vertical direction is located between those units and the display area. As such, the air conduction sound input unit is located close to the user's mouth when the user uses the audio transmission device with a display function, and thus the user's voice or the like can be more reliably converted into an input signal.

(7) The device further includes a connection component connected to an outer end portion of the display component, the connection component being disposed on the same side as the input unit and the output unit. As a result, the input unit and the bone conduction sound output unit can be disposed using the space where the connection component is provided. In other words, the connection component, the input unit, and the bone conduction sound output unit are disposed in a consolidated manner outside the display area. As such, the spaces outside the display area that have the three side sections, of the four side sections defining the display area, located between those spaces and the display area, are reduced in size. This is favorable in terms of narrowing the bezel.

(8) The device further includes an illumination device disposed on a rear side of the display component opposite from a front side where the outer panel is located and irradiating the display component with light, the illumination device including at least a light source disposed on the same side as the input unit and the output unit in a plan view, and a light guide plate that guides light from the light source. As a result, the illumination device uses the light guide plate to guide light emitted from the light source disposed outside the display area, so as to irradiate the display component with that light. The display component can display images in the display area using the light emitted from the illumination device. The input unit and the bone conduction sound output unit are disposed using the space where the light source of the illumination device is provided. In other words, the light source, the input unit, and the bone conduction sound output unit are disposed in a consolidated manner outside the display area. As such, the spaces outside the display area that have the three side sections, of the four side sections defining the display area, located between those spaces and the display area, are reduced in size. This is favorable in terms of narrowing the bezel.

(9) A light-shielding portion is provided on a panel surface, of the outer panel, on the display component side, and outside the display area. As a result, the light-shielding portion makes it difficult for the user to see the input unit and the bone conduction sound output unit disposed outside the display area such that the one side section included in the four side sections defining the display area is located between those units and the display area. This provides a high display quality.

(10) A touch panel pattern for detecting a position of an input made by a user is provided on a panel surface, of the outer panel, on the display component side. As a result, the number of components can be reduced as compared to a case where a touch panel having a touch panel pattern is provided separate from the outer panel. This makes it possible to reduce manufacturing costs.

Effects of the Invention

According to the present invention, a narrower bezel can be achieved.

DETAILED DESCRIPTION OF EMBODIMENTS

Embodiment 1

Figure 1:
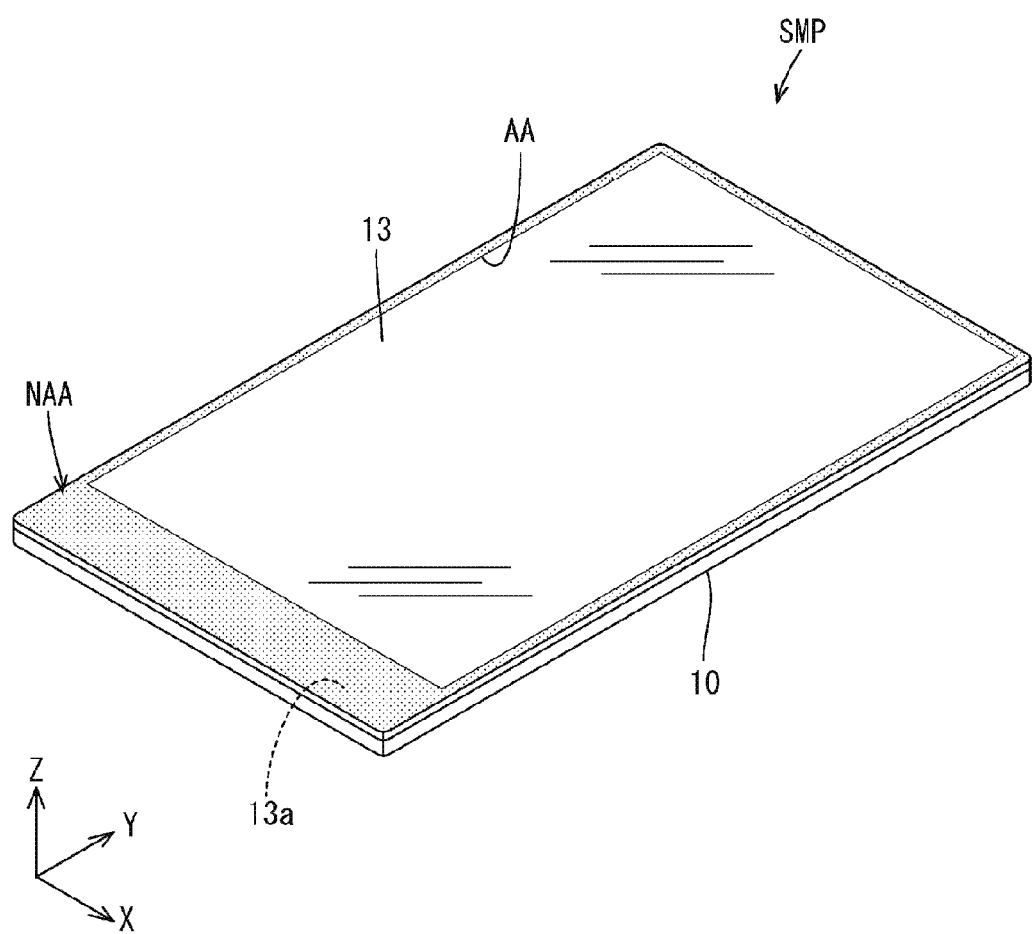
FIG. 1 is a schematic perspective view illustrating the overall external appearance of a smartphone according to Embodiment 1 of the present invention.

Embodiment 1 of the present invention will be described with reference to FIGS. 1 to 8. The present embodiment describes, as an example, a smartphone (an audio transmission device with a display function) SMP including a liquid crystal panel 11 serving as a display component. It can also be said that the smartphone SMP is a "display device with a communication function." Note that X, Y, and Z axes are indicated in a part of each drawing, and are drawn such that the directions of the axes correspond to directions indicated in the drawings. An up-down direction is based on FIGS. 2, 5, and 6, and in these drawings, an upper side corresponds to a front side, whereas a lower side corresponds to a rear side. A vertical direction is based on FIGS. 3 and 4, and in these drawings, a lower side in the vertical direction corresponds to a lower side and an upper side in the vertical direction corresponds to an upper side. A horizontal direction is based on FIGS. 3 and 4.

Figure 7:
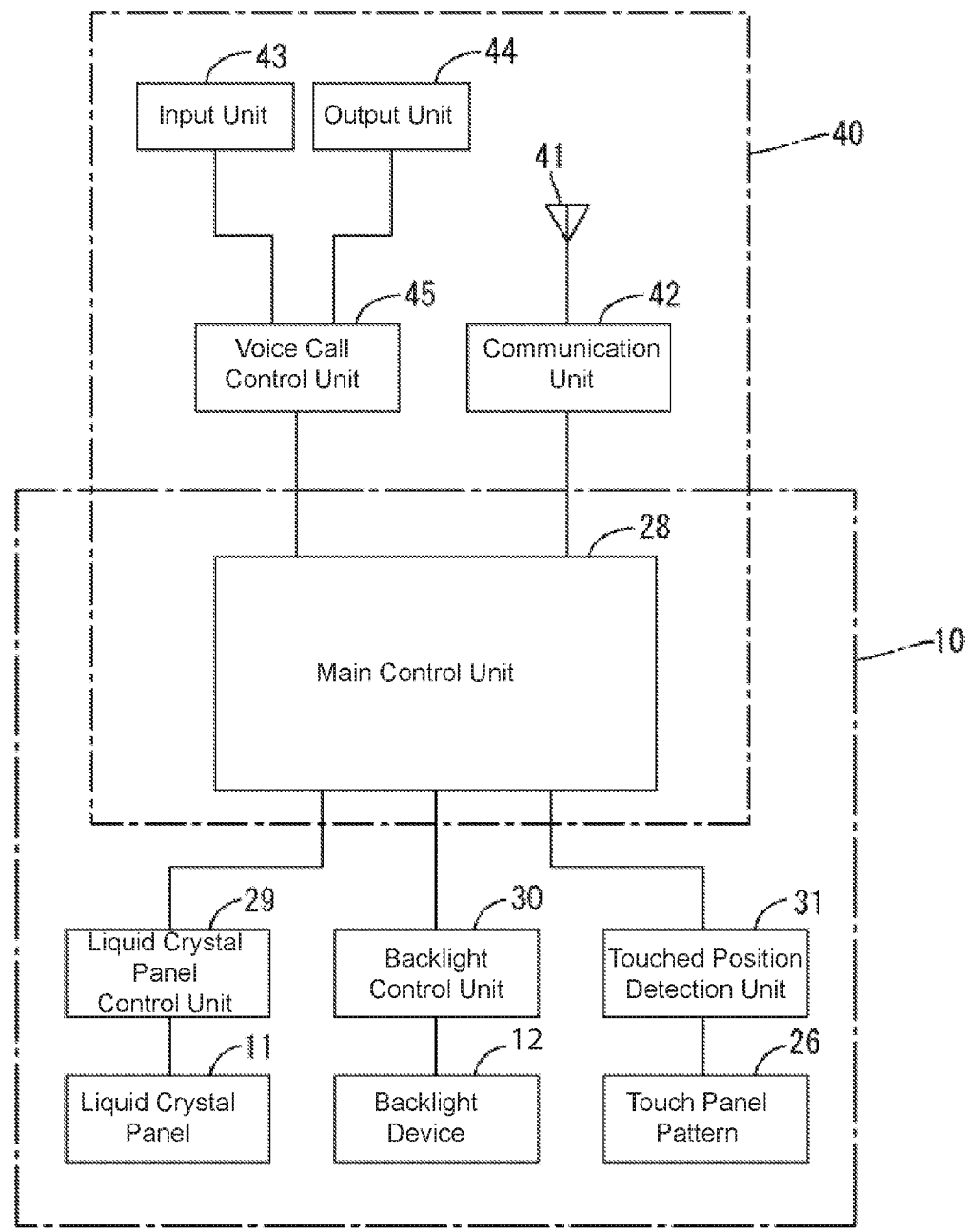
FIG. 7 is a block diagram illustrating the electrical configurations of the liquid crystal display device and an audio/data communication unit.

As illustrated in FIG. 1, the smartphone SMP has a vertically-elongated rectangular shape. As illustrated in FIG. 7, the smartphone SMP includes a liquid crystal display device 10 capable of displaying images and an audio/data communication unit 40 for performing audio voice calls, data communication (sending and receiving data), and the like. It can be said that the smartphone SMP is a multifunction mobile telephone having many other functions in addition to a voice call function and a data communication function. However, compared to a featurephone, whose primary function is a voice call function, it can be said that the smartphone SMP is a mobile telephone whose primary function is a data communication function. First, the liquid crystal display device 10 will be described in detail below.

Figure 2:
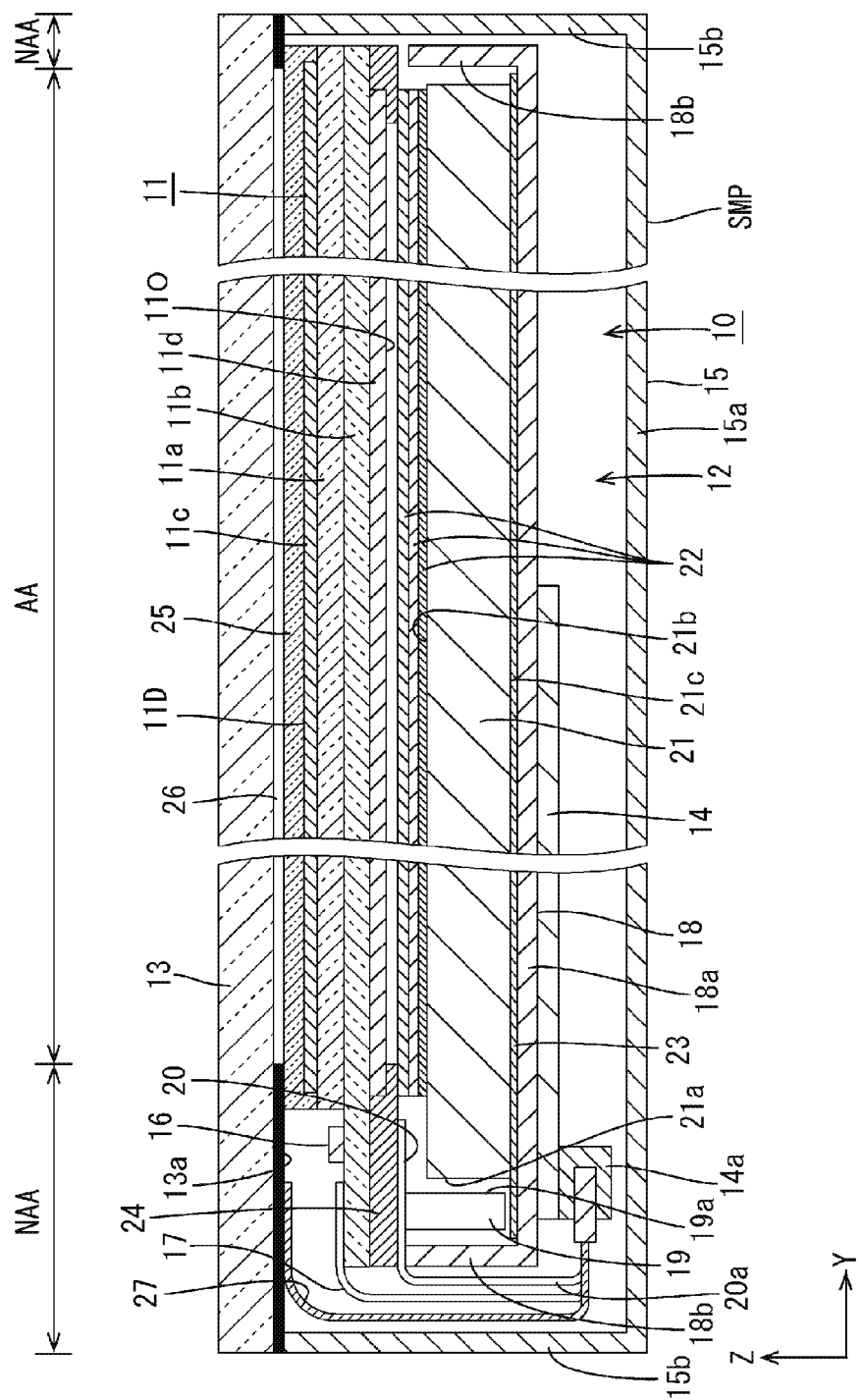
FIG. 2 is a cross-sectional view illustrating the cross-sectional structure of the smartphone and a liquid crystal display device when the smartphone and device are cut along a lengthwise direction thereof.

As illustrated in FIG. 2, the liquid crystal display device 10 includes at least the following: the liquid crystal panel (display component; display panel) 11, in which a panel surface on the front side serves as a display surface 11D that displays images and a panel surface on the rear side serves as an opposite surface 11O; a backlight device (illumination device) 12, disposed on the rear side relative to the liquid crystal panel 11, opposing the opposite surface 11O, that irradiates the liquid crystal panel 11 with light; a cover panel (outer panel) 13 disposed on the front side relative to the liquid crystal panel 11, opposing the display surface 11D, or in other words, on the side opposite from the side on which the backlight device 12 is disposed; a control board (controlling board) 14 disposed on a rear surface side of the backlight device 12; and a casing (case; outer cover member) 15 that contains the liquid crystal panel 11, the backlight device 12, the cover panel 13, the control board 14, and the like. The screen size of the liquid crystal panel 11 is, for example, approximately 3.5 inches to 7 inches, and is thus a size typically classified as small or medium. The respective constituent elements of the liquid crystal display device 10 will be described in detail next.

First, the liquid crystal panel 11 will be described in detail. The liquid crystal panel 11 has an overall rectangular shape when viewed in plan view, and as illustrated in FIG. 2, includes a pair of glass substrates 11*a* and 11*b* that are substantially transparent and have superior light transmissivity, and a liquid crystal layer (not illustrated) interposed between the substrates 11*a* and 11*b* and containing liquid crystal molecules, which are a material whose optical properties change with the application of electrical fields. The substrates 11*a* and 11*b* are fixed together using a sealant (not illustrated) with a gap equivalent to the thickness of the liquid crystal layer remaining therebetween. The display surface 11D of the liquid crystal panel 11 is divided into a display area (active area) AA in which images are displayed, and a non-display area (non-active area) NAA, which has a bezel shape (frame shape) surrounding the display area AA and in which images are not displayed. The display area AA has a rectangular shape when viewed in plan view, and is defined by two long side sections LS1 and LS2 and two short side sections SS1 and SS2. The liquid crystal panel 11 can display images in the display area AA of the display surface 11D using light supplied from the backlight device 12, and a front side of the liquid crystal panel 11 serves as a light-emission side. Note that in the liquid crystal panel 11, a short side direction corresponds to an X-axis direction (the horizontal direction), a long side direction corresponds to a Y-axis direction (the vertical direction), and furthermore, a thickness direction corresponds to a Z-axis direction.

Figure 3:
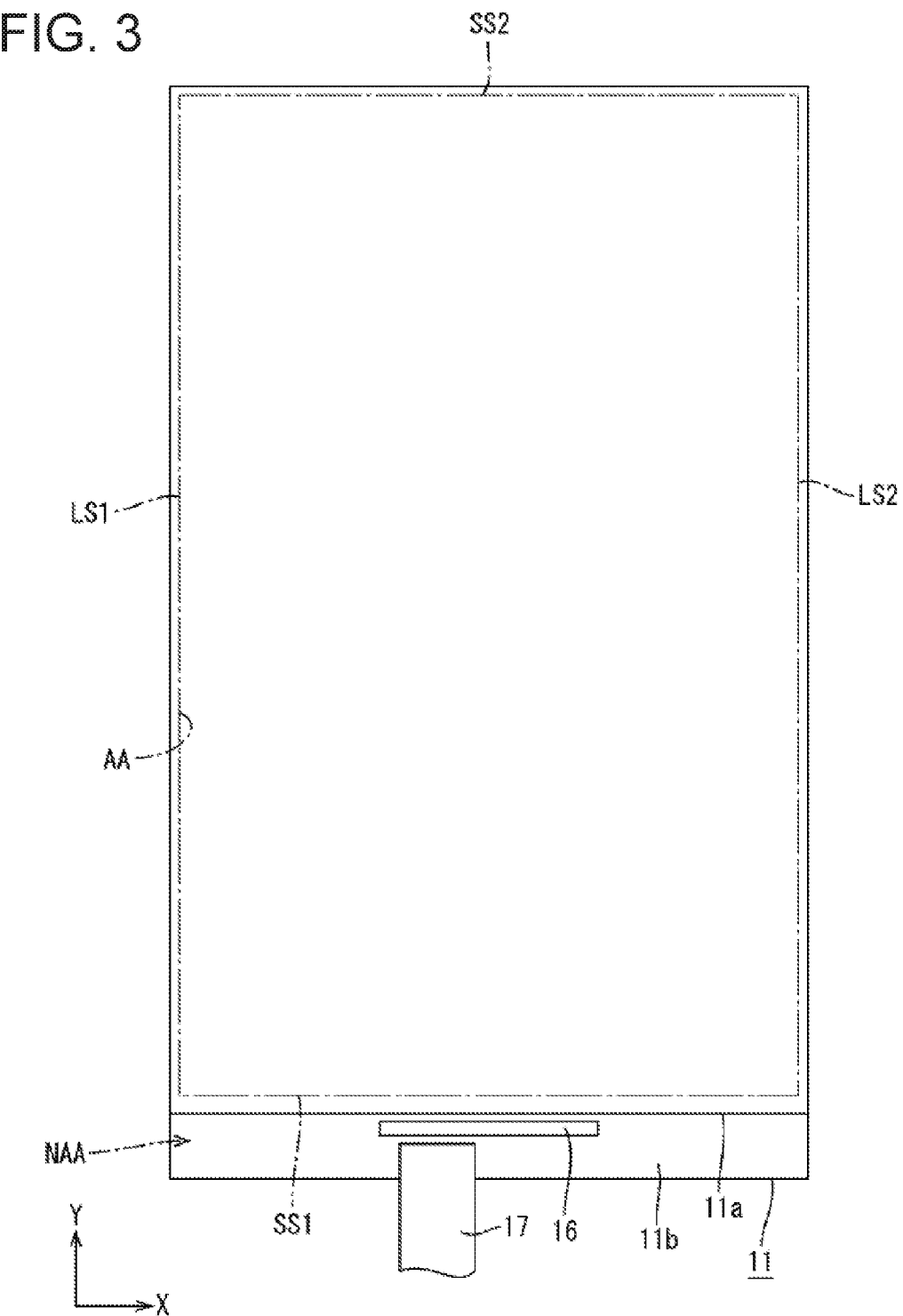
FIG. 3 is a plan view of a liquid crystal panel.

Of the substrates 11*a* and 11*b* constituting the liquid crystal panel 11, the substrate on the front side (a front surface side) serves as a CF substrate 11*a* and the substrate on the rear side (a rear surface side) serves as an array substrate 11*b*. Of these, the array substrate 11*b* has substantially the same short side dimension as the short side dimension of the CF substrate 11*a*, but has a greater long side dimension than the long side dimension of the CF substrate 11*a*, as illustrated in FIG. 3. As such, one short side end portion of the array substrate 11*b* is flush with the corresponding end portion of the CF substrate 11*a*, but the other short side end portion of the array substrate 11*b* projects further outward than the corresponding end portion of the CF substrate 11*a*. A driver (panel driving unit) 16 for driving the liquid crystal panel 11 and a liquid crystal panel flexible board (connection component) 17 that supplies various signals to the driver 16 are attached to the projecting end portion. In other words, the end portion of the array substrate 11*b* that does not overlap with the CF substrate 11*a* when viewed in plan view serves as a mounting area for the driver 16 and the liquid crystal panel flexible board 17.

Of these, the driver 16 is constituted by an LSI chip having a driving circuit therein, and is mounted as a chip on glass (COG) directly on the stated end portion (mounting area) of the array substrate 11*b*, as illustrated in FIG. 3. The liquid crystal panel flexible board 17 includes a base material formed from a synthetic resin material that is insulative and flexible (a polyimide-based resin, for example), and a wiring pattern having numerous wires (not illustrated) is formed on that base material. The liquid crystal panel flexible board 17 is bent back into what is substantially a U shape such that the one end thereof is connected to the stated end portion (mounting area) of the array substrate 11*b* and the other end is connected to the control board 14 disposed on the rear side of the backlight device 12. Various input signals supplied from the control board 14 are sent to the driver 16 through the liquid crystal panel flexible board 17, and thus the driver 16 can generate output signals by processing the various input signals that have been sent and supply the output signals to TFTs in the display area AA, which will be described later. When viewed in plan view, the liquid crystal panel flexible board 17 is disposed so as to be located outside the display area AA (within the non-display area NAA) such that of the side sections LS1, LS2, SS1, and SS2 defining the display area AA in the liquid crystal panel 11, the lower side short side section (one side section) SS1 is located between the display area AA and the liquid crystal panel flexible board 17, as illustrated in FIG. 3. Additionally, one end of the liquid crystal panel flexible board 17 is connected to a location in a central area in the short side direction of the array substrate 11*b*, to the left in FIG. 3. Note that polarizing plates 11*c* and 11*d* are affixed on outer surface sides of the substrates 11*a* and 11*b*, respectively.

The internal structure of the display area AA of the liquid crystal panel 11 (none of which is illustrated) will be described next. Numerous thin film transistors (TFTs), which are switching elements, and pixel electrodes are provided arranged in a matrix (in rows and columns) on an inner surface side of the array substrate 11*b* (a liquid crystal layer side; a surface on the side opposing the CF substrate 11*a*). Gate wires and source wires are arranged around the TFTs and pixel electrodes in a grid pattern. Signals based on an image are supplied to the gate wires and the source wires by the driver 16. The pixel electrodes disposed in quadrangular regions surrounded by the gate wires and the source wires are transparent electrodes formed from indium tin oxide (ITO) or zinc oxide (ZnO).

Meanwhile, numerous color filters are provided on an inner surface side of the CF substrate 11*a*, arranged in locations corresponding to respective pixels. The color filters are disposed with three colors, namely R, G, and B, arranged in an alternating manner. A light shielding layer (a black matrix) for preventing colors from mixing is formed between the color filters. An opposite electrode that opposes the pixel electrodes on the array substrate 11*b* is provided on a surface of the color filters and the light shielding layer. The CF substrate 11*a* is slightly smaller than the array substrate 11*b*. Additionally, alignment films (not illustrated) for aligning the liquid crystal molecules contained in the liquid crystal layer are formed on the inner surface sides of the substrates 11*a* and 11*b*, respectively.

Next, the configuration of the backlight device 12 will be described in detail. The backlight device 12 has an overall rectangular, substantially block shape when viewed in plan view, like the liquid crystal panel 11. As illustrated in FIG. 2, the backlight device 12 includes at least the following: a chassis 18 substantially shaped as a box, open toward the liquid crystal panel 11; light emitting diodes (LED) 19 serving as a light source; an LED board (light source board) 20 on which the LEDs 19 are mounted; a light guide plate 21 that guides light from the LEDs 19; an optical sheet (optical member) 22 laminated onto a front side of the light guide plate 21; and a reflective sheet (reflective member) 23 laminated onto a rear side of the light guide plate 21. The backlight device 12 is disposed such that the LEDs 19 (the LED board 20) are offset toward one end portion of a short side of the backlight device 12 and the liquid crystal panel 11, which makes it possible to realize an edge-lit (side-lit) type, where light is incident on the light guide plate 21 from one side thereof only. Furthermore, the backlight device 12 has panel anchoring tape 24 for anchoring the liquid crystal panel 11. The panel anchoring tape 24 is formed from a synthetic resin, and is applied using an adhesive provided on both surfaces of a base material having an overall rectangular frame shape that follows an outer end portion of the liquid crystal panel 11. The base material of the panel anchoring tape 24 is black on its surface and thus has light-shielding properties, which prevents light leaking from the backlight device 12 from traversing the non-display area NAA of the liquid crystal panel 11. The various constituent elements of the backlight device 12 will be described in sequence next.

The chassis 18 is formed from a metal material (aluminum, for example), and as illustrated in FIG. 2, is shaped substantially as a box that is open toward the front side, which makes it possible to house the LED board 20, the light guide plate 21, the optical sheet 22, and the reflective sheet 23 therein. The chassis 18 is constituted by a base plate portion 18*a* that, like the liquid crystal panel 11, is rectangular when viewed in plan view, and side plate portions 18*b* protruding toward the front side from outer edges on each side of the base plate portion 18*a* (a pair of long sides and a pair of short sides). In the chassis 18 (the base plate portion 18*a*), a long side direction matches the Y-axis direction and a short side direction matches the X-axis direction. The plate surface of the base plate portion 18*a* is parallel to the panel surface of the liquid crystal panel 11, and supports the light guide plate 21, the optical sheet 22, and the reflective sheet 23 contained within the chassis 18 from the rear side. The side plate portions 18*b* are arranged so as to surround the light guide plate 21, the optical sheet 22, and the reflective sheet 23 contained within the chassis 18 from the outer sides, and thus have an overall vertically-elongated rectangular frame shape. A rear side surface of the panel anchoring tape 24 is affixed to leading end portions of the side plate portions 18*b*.

As illustrated in FIG. 2, each LED 19 is formed by using a resin material to seal an LED chip (LED element), which is a semiconductor light-emitting element, on a board part anchored to a board surface of the LED board 20. The LED chip mounted on the board part has a single dominant emitted light wavelength; specifically, a monochromatic LED chip emitting blue light is used. However, a fluorescent material that emits light of a prescribed color upon being excited by the blue light emitted from the LED chip is dispersed throughout the resin material that seals the LED chip, and thus what is generally essentially white light is emitted as a result. A side surface of the LED 19, adjacent to a surface of the LED board 20 on which the LED 19 is mounted, serves as a light-emitting surface 19*a*, and thus the LED 19 is a so-called side-emission type. When viewed in plan view, the LEDs 19 are disposed so as to be located outside the display area AA (within the non-display area NAA), with, of the side sections LS1, LS2, SS1, and SS2 defining the display area AA in the liquid crystal panel 11, the short side SS1 on the lower side in FIG. 3 (the lower side in the vertical direction), or in other words, the short side SS1 located between the display area AA and the liquid crystal panel flexible board 17, being located between the LEDs 19 and the display area AA.

As illustrated in FIG. 2, the LED board 20 has a flexible film-type (sheet-type) board part (base material) formed from an insulative material, and a board surface thereof is parallel to the panel surface of the liquid crystal panel 11. The above-described LEDs 19 are surface-mounted on a rear side board surface of the LED board 20 (a board surface on the opposite side of the LED board 20 as the side on which the liquid crystal panel 11 is located, that is, the board surface facing the light guide plate 21), and a wiring pattern (not illustrated) for supplying power to the LEDs 19 is patterned into that board surface. The LED board 20 is shaped as a rectangle extending along the short side direction of the backlight device 12 (the X-axis direction), and a plurality of the LEDs 19 are arranged having gaps therebetween along that direction of extension and are mounted to the LED board 20. A long side dimension of the LED board 20 is substantially the same as a short side dimension of the light guide plate 21, and a short side dimension of the LED board 20 is wider than a gap present between the side plate portions 18*b* of the chassis 18 and the light guide plate 21. Accordingly, the part of the LED board 20 in the short side direction (the Y-axis direction) located on the side of the light guide plate 21 overlaps with the light guide plate 21 on the front side. The LED board 20 is disposed on the rear side relative to the liquid crystal panel 11 with respect to the Z-axis direction, and is anchored to the liquid crystal panel 11 by the panel anchoring tape 24. When viewed in plan view, the LED board 20 is disposed so as to be located outside the display area AA (within the non-display area NAA), with, of the side sections LS1, LS2, SS1, and SS2 defining the display area AA in the liquid crystal panel 11, the short side SS1 on the lower side in FIG. 3 (the lower side in the vertical direction), or in other words, the short side SS1 located between the display area AA and the liquid crystal panel flexible board 17 and LEDs 19, being located between the LED board 20 and the display area AA. Meanwhile, an extended portion 20*a* is provided on the LED board 20 extending outward from a main body portion on which the LEDs 19 are mounted (a mounting main body portion), and the extended portion 20*a* is bent back into what is substantially a U shape such that an extended top end thereof is connected to the control board 14. Driving power can therefore be supplied to the LEDs 19 from the control board 14.

As illustrated in FIG. 2, the light guide plate 21 is a plate having a rectangular shape slightly smaller than the base plate portion 18*a* of the chassis 18, the plate surface thereof being parallel to the panel surface of the liquid crystal panel 11 and the plate surface of the base plate portion 18*a* of the chassis 18. Additionally, in the plate surface of the light guide plate 21, a long side direction matches the Y-axis direction and a short side direction matches the X-axis direction, and a plate thickness direction orthogonal to the plate surface matches the Z-axis direction. The light guide plate 21 is surrounded by the side plate portions 18*b* and contained within the chassis 18, and is disposed in a location directly below the liquid crystal panel 11 and the optical sheet 22. Of the outer end surfaces of the light guide plate 21, the left-side short side end surface indicated in FIG. 2 serves as a light-incident surface (light source-opposing end surface) 21*a* that opposes the LEDs 19 and on which light from the LEDs 19 is incident. On the other hand, of the outer end surfaces of the light guide plate 21, the three end surfaces aside from the light-incident surface 21*a* (the right-side short side end surface and the pair of long-side end surfaces indicated in FIG. 2) serve as non LED-opposing end surfaces (non light source-opposing end surfaces) that do not oppose the LEDs 19. Meanwhile, of the pair of plate surfaces on the front and rear of the light guide plate 21, the plate surface facing the front side (the liquid crystal panel 11 side) serves as a light emission surface 21*b* that emits light toward the liquid crystal panel 11. On the other hand, the panel surface of the light guide plate 21 that faces the rear side serves as an opposing plate surface 21*c* on the opposite side as the side on which the light emission surface 21*b* is located. According to this configuration, a direction in which the LEDs 19 and the light guide plate 21 are arranged matches the Y-axis direction, a direction in which the optical sheet 22 (the liquid crystal panel 11) and the light guide plate 21 are arranged matches the Z-axis direction, and these directions are orthogonal to each other. The light guide plate 21 has a function of allowing in light emitted from the LEDs 19 in essentially the Y-axis direction through the light-incident surface 21*a*, allowing that light to propagate through the interior thereof, and directing the light upward toward the optical sheet 22 (the front side; a light emission side) such that the light is emitted from the light emission surface 21*b*, which is the plate surface on the front side. Note that a light reflection pattern (not illustrated) formed from a light reflecting portion, for reflecting the light within the light guide plate 21 toward the light emission surface 21*b* to ensure the light is emitted from the light emission surface 21*b*, is formed on the opposing plate surface 21*c* of the light guide plate 21.

As illustrated in FIG. 2, the optical sheet 22 is, like the light guide plate 21, shaped as a rectangle when viewed in plan view, and a sheet surface thereof is parallel to the panel surface of the liquid crystal panel 11 and the plate surfaces of the base plate portion 18*a* of the chassis 18 and the light guide plate 21. A long side direction of the sheet surface matches the Y-axis direction, a short side direction matches the X-axis direction, and a plate thickness direction orthogonal to the sheet surface matches the Z-axis direction. The optical sheet 22 is placed upon the front side of the light emission surface 21*b* of the light guide plate 21, disposed so as to be interposed between the liquid crystal panel 11 and the light guide plate 21, which allows the transmission of light emitted from the light guide plate 21 and ensures that the transmitted light is emitted toward the liquid crystal panel 11 having been imparted with a prescribed optical effect. The optical sheet 22 is formed by laminating a plurality of (three, in the present embodiment) sheets together. The rear side surface of the panel anchoring tape 24 is affixed to outer end portions of the optical sheet 22 furthest on the front side. A diffusion sheet, a lens sheet, and a reflective polarizing sheet can be given as specific examples of the type of the optical sheet 22, and one of these can be selected as desired and used.

As illustrated in FIG. 2, the reflective sheet 23 is disposed so as to cover a rear side of the light guide plate 21, or in other words, the opposing plate surface 21*c* that is the side opposite from the side on which the light emission surface 21*b* is located. The reflective sheet 23 is formed from a sheet material made from a synthetic resin whose surface is a white color having superior light-reflective properties, and thus the light propagating through the light guide plate 21 and emitted from the opposing plate surface 21*c* can be efficiently directed toward the front side (the light emission surface 21*b*). The reflective sheet 23 is, like the light guide plate 21 and the optical sheet 22, shaped as a rectangle when viewed in plan view, and is disposed such that a large part of the central area thereof is interposed between the light guide plate 21 and the base plate portion 18*a* of the chassis 18. Outer end portions of the reflective sheet 23 extend further outward than the outer edge surfaces of the light guide plate 21, and particularly with respect to the end portions on the LED board 20 side, extend from the light-incident surface 21*a* of the light guide plate 21 to a location past the LEDs 19. As such, light from the LEDs 19 can be reflected efficiently by the extended portions and made incident on the light-incident surface 21*a*.

The cover panel 13 will be described next. As illustrated in FIGS. 1 and 2, the cover panel 13 is disposed so as to cover the entire liquid crystal panel 11 from the front side, which protects the liquid crystal panel 11, and also forms the exterior of the liquid crystal display device 10 and the smartphone SMP on the front surface sides thereof. A rear side panel surface of the cover panel 13 is anchored in a fixed state to the display surface 11D of the liquid crystal panel 11 using an adhesive 25. The adhesive 25 is formed from an ultraviolet light-curable resin material, for example. The cover panel 13 is formed from a plate-shaped glass base material that is substantially transparent and has superior light transmissivity, and is preferably formed from strengthened glass. Preferably, the strengthened glass used for the cover panel 13 is chemically-strengthened glass having a chemically-strengthened layer on the surface thereof, provided, for example, by subjecting the surface of a plate-shaped glass base material to a chemical strengthening process. This chemical strengthening process refers to, for example, a process of strengthening the plate-shaped glass base material through ion exchange that exchanges alkali metal ions contained in the glass material with alkali metal ions having a greater ionic radius. The chemically-strengthened layer formed as a result retains compressive stress and thus serves as a compressive stress layer (ion exchanged layer). As a result, the cover panel 13 has a high mechanical strength and high impact resistance, which makes it possible to reliably prevent the liquid crystal panel 11 disposed on the rear side from being broken, scratched, and so on.

Figure 4:
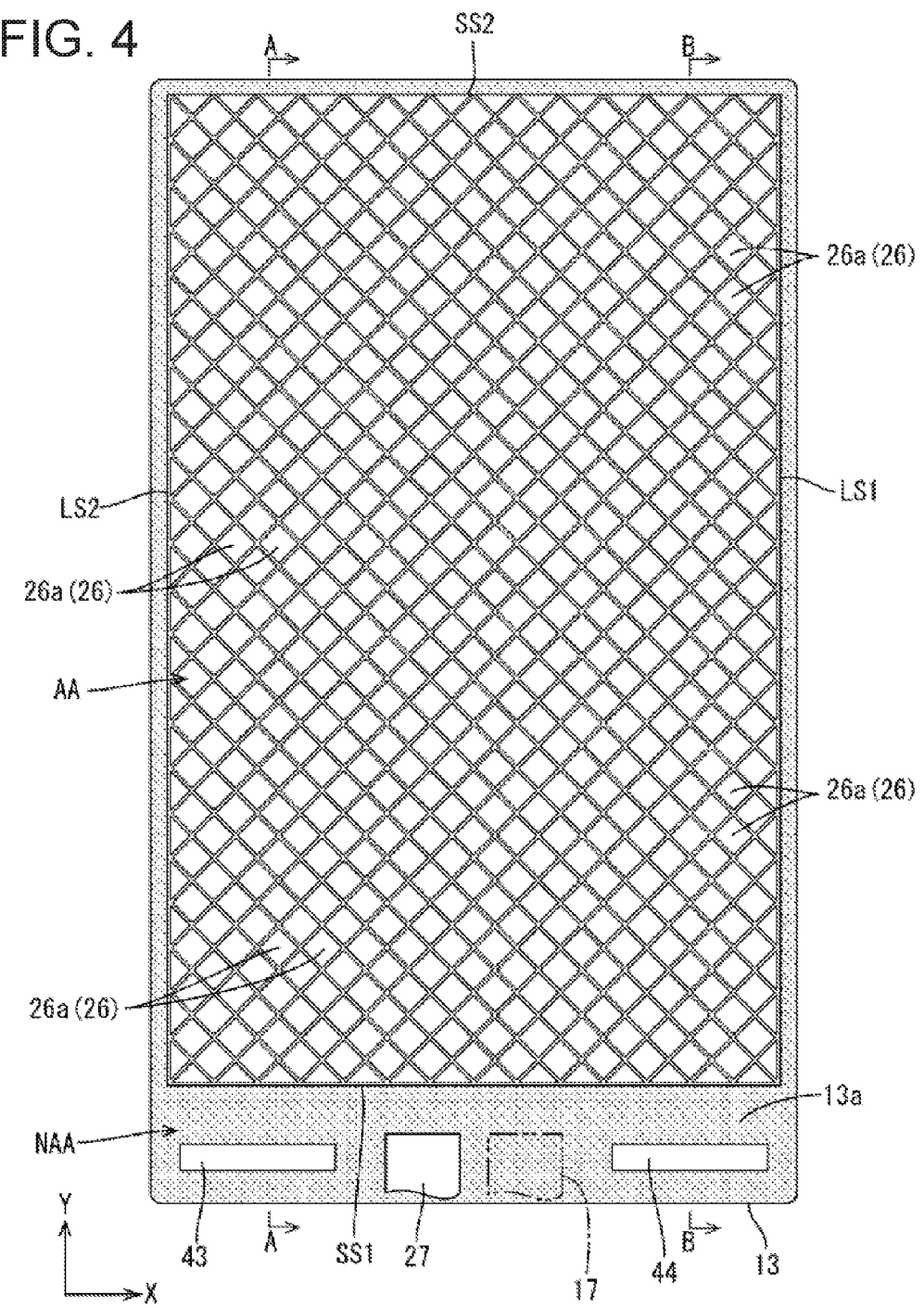
FIG. 4 is a bottom view of a cover panel.

As illustrated in FIGS. 2 and 4, the cover panel 13 has, like the liquid crystal panel 11, a vertically-elongated rectangular shape when viewed in plan view, and the cover panel 13 is slightly larger than the liquid crystal panel 11 when viewed in plan view. Accordingly, a peripheral portion of the cover panel 13 extends beyond the outer edges of the liquid crystal panel 11 in an overhanging manner. A light-shielding portion 13a, disposed surrounding the display area AA of the liquid crystal panel 11 and overlapping with the non-display area NAA when viewed in plan view, and that blocks light at the periphery of the display area AA (outside the display area AA), is formed in the cover panel 13. The light-shielding portion 13a is formed from a light-shielding material such as a black coating material, and the light-shielding material is provided as an integrated part of the rear side panel surface of the cover panel 13 by being printed onto that panel surface, or in other words, onto the panel surface on the liquid crystal panel 11 side. The light-shielding portion 13a can block light including visible light, infrared light, and ultraviolet light. Note that a printing technique such as screen printing or ink jet printing can be used to form the light-shielding portion 13a. In addition to a portion of the cover panel 13 overlapping with the entire non-display area NAA of the liquid crystal panel 11, the light-shielding portion 13a is formed in substantially the entire peripheral portion that extends further outward than the outer edges of the liquid crystal panel 11, or in other words, the area outside the display area AA. Accordingly, the light-shielding portion 13a has a vertically-elongated, substantially frame shape (substantially bezel shape) when viewed in plan view, and is therefore capable of shielding light from the backlight device 12 in the periphery of the display area AA, before that light is incident on the rear side panel surface of the cover panel 13. In other words, the light-shielding portion 13a is formed across substantially the entire part of the cover panel 13 that does not overlap with the display area AA of the liquid crystal panel 11 when viewed in plan view. Note that in FIGS. 1 and 4, the light-shielding portion 13a (the area outside the display area AA) is indicated by shading, and the quadrangular white area on the inner side thereof is an area that transmits light from the display area AA.

As illustrated in FIGS. 2 and 4, a touch panel pattern 26 for detecting the position of an input made by a user is provided on the rear side of the cover panel 13, or in other words, on the panel surface on the liquid crystal panel 11 side. In other words, the cover panel 13 constitutes both an "outer panel" and a "touch panel" of the smartphone SMP. The touch panel pattern 26 is what is known as a projection-type electrostatic capacitance system, and is constituted of numerous touch panel transparent electrode portions 26a arranged in rows and columns on the rear side panel surface of the cover panel 13. A terminal portion (not illustrated) connected to the end portions of wires extended from the touch panel pattern 26 is formed in an end portion of the cover panel 13 on the lower side in FIG. 4 (a lower side in the vertical direction), and a touch panel flexible board 27 is connected to the terminal portion. The touch panel flexible board 27 includes a base material formed from a synthetic resin material that is insulative and flexible (a polyimide-based resin, for example), and a wiring pattern having numerous wires (not illustrated) is formed on that base material. The touch panel flexible board 27 is bent back into what is substantially a U shape such that the one end thereof is connected to the stated end portion of the cover panel 13 and the other end is connected to the control board 14 disposed on the rear side of the backlight device 12. Electric potentials are supplied to the touch panel transparent electrode portions 26a that constitute the touch panel pattern 26, from the control board 14 via the touch panel flexible board 27. When viewed in plan view, the touch panel flexible board 27 is disposed so as to be located outside the display area AA (within the non-display area NAA), with, of the side sections LS1, LS2, SS1, and SS2 defining the display area AA in the liquid crystal panel 11, the short side SS1 on the lower side in FIG. 4 (the lower side in the vertical direction), or in other words, the short side SS1 located between the display area AA and the liquid crystal panel flexible board 17 and LEDs 19, being located between the touch panel flexible board 27 and the display area AA. Additionally, one end of the touch panel flexible board 27 is connected to a location in a central area in the short side direction (the X-axis direction) of the cover panel 13, to the left in FIG. 4. Note that when viewed in plan view, the touch panel flexible board 27 is disposed adjacent to the liquid crystal panel flexible board 17 in the stated central area.

The control board 14 is formed by mounting various electronic components (not illustrated) on a substrate made of paper phenol or glass epoxy resin, and furthermore routing a prescribed wiring pattern (conductive paths) (not illustrated) thereon. As illustrated in FIG. 2, the control board 14 is attached to the rear side plate surface of the base plate portion 18a of the chassis 18, which partially constitutes the backlight device 12, using an attachment member (not illustrated). A plurality of connector parts 14a, connected individually to the liquid crystal panel flexible board 17, the extended portion 20a of the LED board 20, the touch panel flexible board 27, and so on, respectively, are provided in the control board 14. Note that in FIG. 2, of the plurality of connector parts 14a, only the connector parts 14a connected to the end portion of the liquid crystal panel flexible board 17 is illustrated, as a representative example.

As illustrated in FIG. 7, the control board 14 includes at least the following: a main control unit 28 that carries out control for realizing the various functions of the liquid crystal display device 10 and the smartphone SMP; a liquid crystal panel control unit 29 that controls the liquid crystal panel 11; a backlight control unit 30 that controls the backlight device 12; and a touched position detection unit 31 that detects position information inputted to the touch panel pattern 26. The main control unit 28 has a central processing unit (CPU) and the like, and is capable of controlling the operations of the liquid crystal panel control unit 29, the backlight control unit 30, and the touched position detection unit 31. The liquid crystal panel control unit 29 is connected to the liquid crystal panel 11 by the liquid crystal panel flexible board 17 and is capable of sending various signals to the driver 16, and is thus capable of controlling the driving of the liquid crystal panel 11 through the driver 16. The backlight control unit 30 is capable of supplying power to the LEDs 19 of the backlight device 12 through the extended portion 20*a* of the LED board 20, and is thus capable of controlling the driving of the LEDs 19. The touched position detection unit 31 is connected to the touch panel pattern 26 of the cover panel 13 by the touch panel flexible board 27, and is capable of detecting position information inputted to the touch panel pattern 26 by a user by processing output signals from the touch panel pattern 26.

The casing 15 is formed from a synthetic resin material or a metal material, and as illustrated in FIG. 2, is shaped substantially as a box that is open toward the front side. The liquid crystal panel 11 and the backlight device 12 are contained within the casing 15 from the front side through that opening. The casing 15 is constituted of a base wall portion 15*a* and side wall portions 15*b* protruding toward the front side from outer edges of the base wall portion 15*a* so as to form what is substantially a box shape. The outer end portion of the cover panel 13 is supported, around the entire periphery thereof, from the rear side by leading end portions of the protruding side wall portions 15*b*. The side wall portions 15*b* that form the box shape surround the members such as the liquid crystal panel 11, the backlight device 12, and the control board 14 from outer peripheral sides thereof.

The audio/data communication unit 40 will be described next. As illustrated in FIG. 7, the audio/data communication unit 40 includes at least the following: an antenna 41 for sending and receiving radio waves to and from an external base station or the like; a communication unit 42 that communicates using radio waves through the antenna 41; an input unit (bone conduction sound input unit) 43 for converting input sound such as the voice of a user of the smartphone SMP into an input signal; an output unit (bone conduction sound output unit) 44 for converting an output signal of a call partner's voice or the like into output sound; a voice call control unit 45 for controlling voice calls by processing input signals from the input unit 43 and outputting output signals to the output unit 44; and the main control unit 28, which controls the operations of the communication unit 42 and the voice call control unit 45. Of these, the main control unit 28 is a part of both the audio/data communication unit 40 and the liquid crystal display device 10. In addition to communication for voice calls, the communication unit 42 carries out data communication (sending and receiving emails, sending and receiving pictures and videos, and so on). The communication unit 42 and the voice call control unit 45 are provided in the control board 14 (see FIG. 2) along with the main control unit 28.

Figure 5:
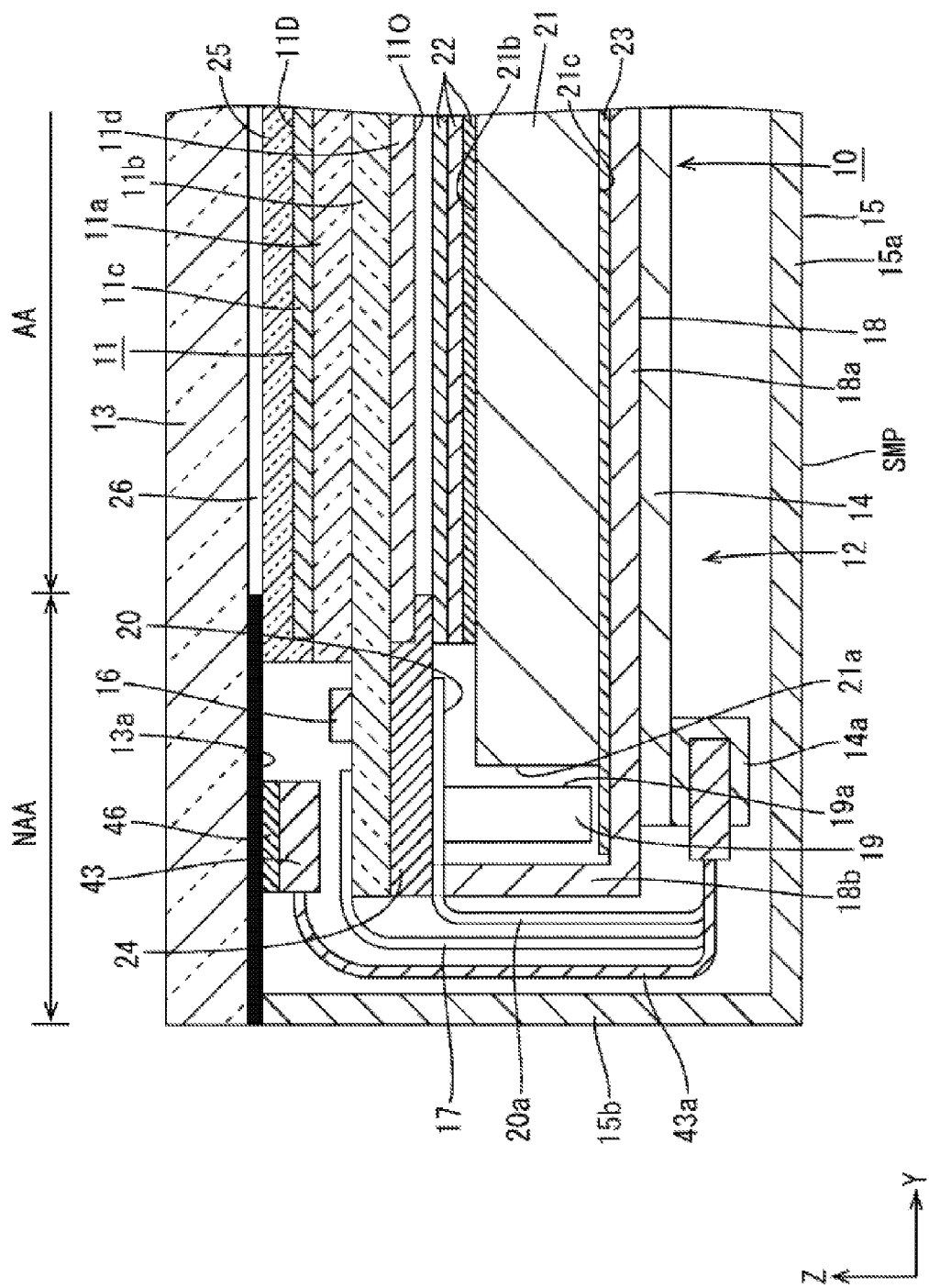
FIG. 5 is a cross-sectional view taken from an A-A line in FIG. 4.
Figure 6:
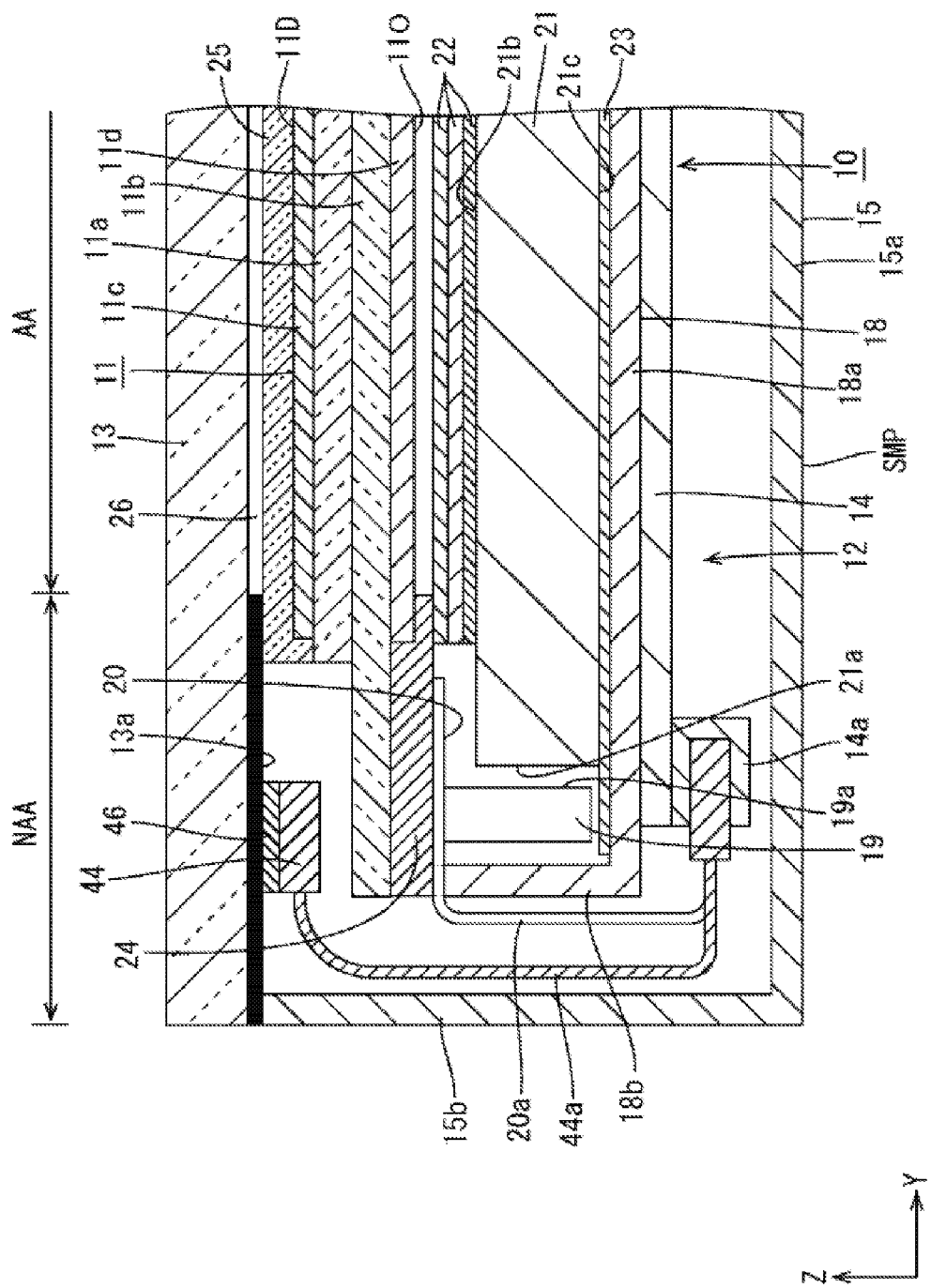
FIG. 6 is a cross-sectional view taken from a B-B line in FIG. 4.

However, as illustrated in FIGS. 5 and 6, the input unit 43 and the output unit 44 are attached to the cover panel 13, and the specific arrangements thereof will be described later. The input unit 43 and the output unit 44 are anchored to the cover panel 13 by anchoring tape 46. The anchoring tape 46 is made by applying an adhesive substance to both surfaces of a base material made from a synthetic resin. The input unit 43 and the output unit 44 have connection wire parts (lead wire parts) 43*a* and 44*a*, respectively, which are connected to the control board 14. The connection wire parts 43*a* and 44*a* are bent back into what is substantially a U shape such that one end of each thereof is connected to main body portions of the input unit 43 and the output unit 44, respectively, and another end of each thereof is connected to the connector parts 14*a* of the control board 14 disposed on the rear side of the backlight device 12. The input unit 43 converts input bone conduction sound, which is input sound transmitted through the cover panel 13, into an input signal. The output unit 44 converts an output signal and causes the cover panel 13 to transmit output bone conduction sound, which is output sound. The input unit 43 and the output unit 44 are both constituted of vibrating elements capable of converting vibrations from bone conduction sound (mechanical energy) into electrical signals (electrical energy) and vice versa (that is, reversible conversion). Coil-type vibrators, piezoelectric vibrators (piezoelectric ceramics) using ferroelectric materials such as lead zirconate titanate (PZT), film-type vibrators using organic films formed from a polyvinylidene fluoride (PVDF) ferroelectric body, and so on can be used as the vibrating elements that constitute the input unit 43 and the output unit 44. In the case where air conduction-type units that convert air conduction sound into electrical signals are used as the input unit and the output unit, it is necessary to provide an opening in the cover panel. However, the present embodiment uses the bone conduction-type input unit 43 and output unit 44 that convert bone conduction sound into electrical signals as described above, and thus no opening need be provided in the cover panel 13, which is favorable in terms of designability and watertightness. Note that the antenna 41 is disposed so as to be contained within the casing 15.

In the present embodiment, when viewed in plan view, the input unit 43 and output unit 44 constituting the audio/data communication unit 40 are disposed so as to be located outside the display area AA (within the non-display area NAA), with, of the side sections LS1, LS2, SS1, and SS2 defining the display area AA in the liquid crystal panel 11, the short side section (one side section) SS1 on the lower side in FIG. 4 (the lower side in the vertical direction) located between those units and the display area AA, as illustrated in FIG. 4. The input unit 43 and the output unit 44 are consolidated outside the display area AA, with the same short side section SS1 of the side sections LS1, LS2, SS1, and SS2 defining the display area AA being located between those units and the display area AA. Accordingly, the spaces (bezel widths) outside the display area AA that have the other three side sections LS1, LS2, and SS2 located between those spaces and the display area AA are reduced in size. This makes it possible to ensure a broader display area AA in the display surface 11D of the liquid crystal panel 11; specifically, the percentage of the display area AA occupying the surface of the cover panel 13 can be increased to 90% or greater. Furthermore, the bezel can be narrowed on the three side sections LS1, LS2, and SS2 where the input unit 43 and the output unit 44 are not disposed, which provides superior designability in terms of the external appearance. Additionally, disposing the input unit 43 and the output unit 44 outside the display area AA makes it difficult for those units to interfere with images displayed in the display area AA.

Moreover, when viewed in plan view, the input unit 43 and the output unit 44 are disposed so as to be located outside the display area AA, with, of the side sections LS1, LS2, SS1, and SS2 defining the display area AA in the liquid crystal panel 11, the short side SS1 located between the display area AA and the liquid crystal panel flexible board 17, being located between those units and the display area AA, as illustrated in FIG. 4. In this manner, the input unit 43 and the output unit 44 are disposed using the space where the liquid crystal panel flexible board 17 is provided. As such, the spaces outside the display area AA that have the other three side sections LS1, LS2, and SS2, on which the input unit 43, the output unit 44, and the liquid crystal panel flexible board 17 are not disposed, located between those spaces and the display area AA, are reduced in size. This is favorable in terms of narrowing the bezel. Furthermore, when viewed in plan view, the input unit 43 and the output unit 44 are disposed so as to be located outside the display area AA (within the non-display area NAA), with, of the side sections LS1, LS2, SS1, and SS2 defining the display area AA in the liquid crystal panel 11, the short side SS1 located between the display area AA and the LEDs 19 being located between those units and the display area AA. In this manner, the input unit 43 and the output unit 44 are disposed using the space where the LEDs 19 are provided. As such, the spaces outside the display area AA that have the other three side sections LS1, LS2, and SS2, on which the input unit 43, the output unit 44, and the LEDs 19 are not disposed, located between those spaces and the display area AA, are reduced in size. This is favorable in terms of narrowing the bezel.

Furthermore, as illustrated in FIGS. 5 and 6, the input unit 43 and the output unit 44 are attached to the rear side of the cover panel 13, or in other words, to the panel surface on the liquid crystal panel 11 side, using the anchoring tape 46. Input bone conduction sound transmitted through the cover panel 13 is directly transmitted to the input unit 43 attached to the rear side panel surface of the cover panel 13, and thus the input bone conduction sound can be reliably converted into an input signal by the input unit 43. The output unit 44 attached to the rear side panel surface of the cover panel 13 converts output signals into output bone conduction sound and causes the cover panel 13 to directly transmit that output bone conduction sound, which provides superior transmission efficiency. This makes it possible to reliably convert the input bone conduction sound into an input signal, and makes it possible to efficiently transmit output bone conduction sound, obtained by converting an output signal, to a user. As such, better voice call quality can be achieved. Additionally, when viewed in plan view, the input unit 43 and the output unit 44 are disposed on the rear side panel surface of the cover panel 13 so as to overlap with the light-shielding portion 13a provided outside the display area AA. According to this arrangement, the light-shielding portion 13a makes it difficult for the user to see the input unit 43 and the output unit 44 through the cover panel 13, which ensures a high display quality for images displayed in the display area AA. Meanwhile, as illustrated in FIG. 4, the input unit 43 is disposed in a location of the cover panel 13 that is closer, in the short side direction (X-axis direction; the direction following the one side section SS1) thereof, to the left end side (one end side) in FIG. 4, whereas the output unit 44 is disposed in a location of the cover panel 13 that is closer, in the short side direction (the direction following the one side section SS1) thereof, to the right end side (another end side) in FIG. 4. As opposed to this, the liquid crystal panel flexible board 17 and the touch panel flexible board 27 are disposed in a central area with respect to the X-axis direction, and thus the arrangement is such that the liquid crystal panel flexible board 17 and the touch panel flexible board 27 are located between the input unit 43 and the output unit 44.

Figure 8:
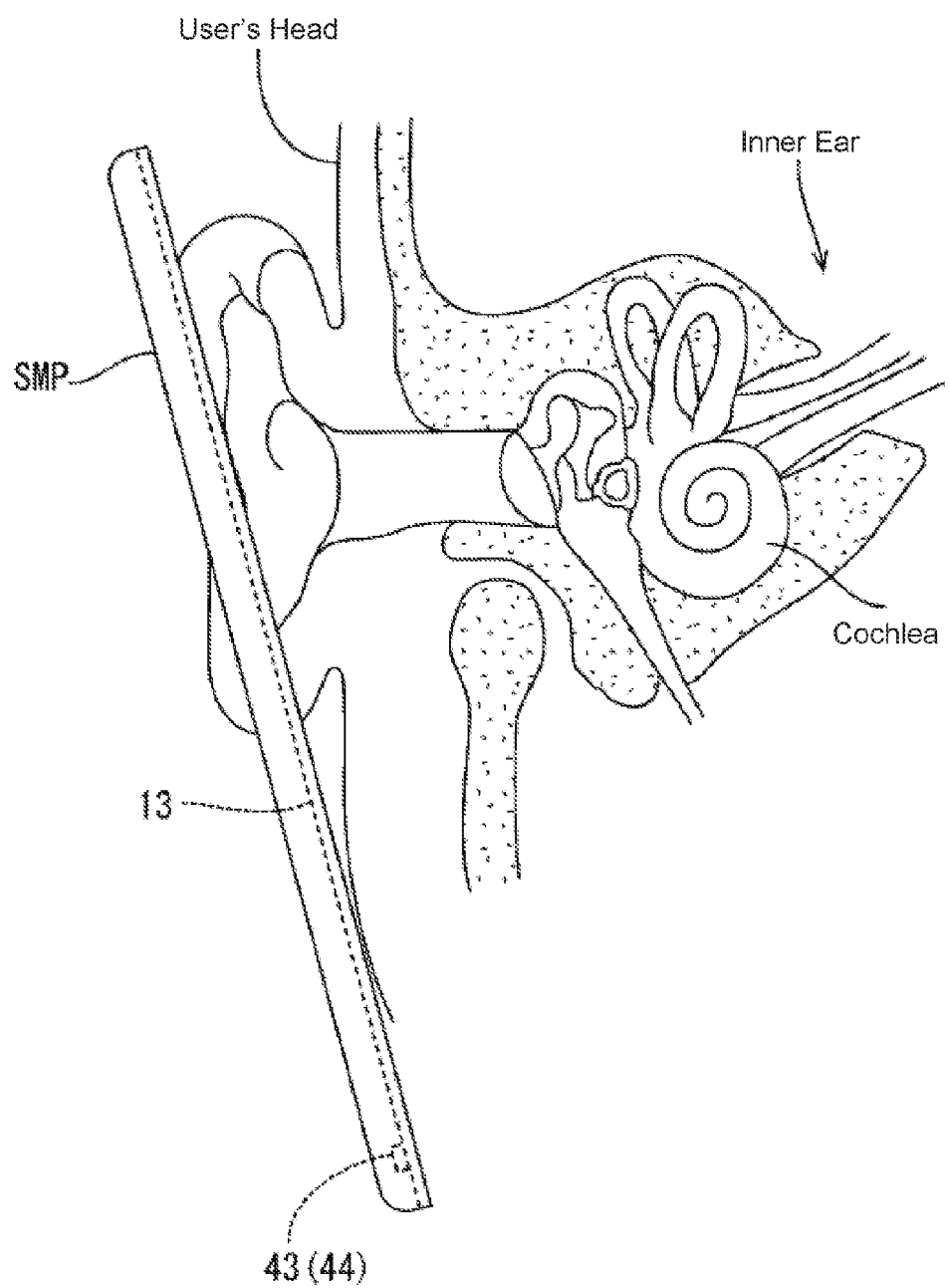
FIG. 8 is a diagram illustrating a state in which a user uses the smartphone.

Next, operations in the case where a user uses the smartphone SMP configured as described above to carry out a voice call with a call partner using a voice call function will be described. Sound emitted from the user's vocal cords is, as illustrated in FIG. 8, conducted through bone, such as the skull, to the cover panel 13 in contact with the user's head area. The input bone conduction sound transmitted to the cover panel 13 propagates along the cover panel 13 while vibrating the cover panel 13 (that is, is conducted through bone conduction), and reaches the input unit 43 attached to the rear side panel surface of the cover panel 13. The input bone conduction sound that has reached the input unit 43 is converted into an input signal by the input unit 43. The input signal obtained from the conversion performed by the input unit 43 is processed by the voice call control unit 45 and then sent as radio waves to an external base station by the communication unit 42 through the antenna 41, as illustrated in FIG. 7. Here, noise arising around the user is air conduction sound, and thus is not conducted through bone by the cover panel 13. Accordingly, such noise is not inputted to the input unit 43 as input sound. As such, the user's voice is selectively inputted to the input unit 43 as bone conduction input sound, which makes it possible to send clear voice to the call partner.

On the other hand, when the antenna 41 receives a radio wave containing the call partner's converted voice, the signal of that radio wave is processed by the communication unit 42 and the voice call control unit 45 and sent to the output unit 44 as an output signal, as illustrated in FIG. 7. The output signal sent to the output unit 44 is converted into output bone conduction sound by the output unit 44 and is transmitted to the cover panel 13 as vibrations. The output bone conduction sound transmitted to the cover panel 13 propagates along the panel surface of the cover panel 13 while vibrating the cover panel 13 (that is, is conducted through bone conduction), and is transmitted to the user's head area in contact with the cover panel 13, as illustrated in FIG. 8. The output bone conduction sound transmitted to the user's head area is conducted by the skull and so on in the user's head area, reaches the cochlea of the inner ear, and is sensed there as the call partner's voice. As such, the user hears the output bone conduction sound via the cover panel 13 as output voice, which makes it difficult for the output sound, which is the content of the voice call, to be drowned out by air conduction sound such as noise arising around the user. The call partner's voice can therefore be sensed more clearly. By using the cover panel 13 as a vibration plate for bone conduction in the above-described manner, voice from the voice call can be made clearer, which in turn improves the voice call quality. Moreover, affixing the input unit 43 and the output unit 44 directly to the cover panel 13 provides superior bone conduction sound transmission efficiency, which in turn improves the voice call quality even more. Note that a prescribed image can be displayed in the display area AA of the liquid crystal panel 11 during the above-described voice call.

The smartphone (audio transmission device with a display function) SMP according to the present embodiment as described above includes: the liquid crystal panel (display component) 11 having the display surface in which a quadrangular display area AA that displays images is defined; the cover panel (outer panel) 13 disposed so as to cover the display surface 11D of the liquid crystal panel 11; the input unit 43 disposed so as to be located outside the display area AA such that the one side section SS1 included in the four side sections LS1, LS2, SS1, and SS2 defining the display area AA is located between the input unit 43 and the display area AA, the input unit 43 converting input bone conduction sound transmitted through the cover panel 13 into an input signal; and the output unit (bone conduction sound output unit) 44 disposed so as to be located outside the display area AA such that the one side section SS1 included in the four side sections LS1, LS2, SS1, and SS2 defining the display area AA and located between the display area AA and the input unit 43 is located between the output unit 44 and the display area AA, the output unit 44 converting an output signal and transmitting that output signal as output bone conduction sound to the cover panel 13.

Accordingly, during a voice call, the user makes direct contact with the cover panel 13 disposed so as to cover the display surface 11D of the liquid crystal panel 11, and thus the output bone conduction sound obtained by the output unit 44 converting the output signal is transmitted through the cover panel 13. The output bone conduction sound can thus be conducted through bone conduction to the user's inner ear and recognized as voice. Meanwhile, voice produced by the user during a voice call is transmitted through the cover panel 13 as the input bone conduction sound, is converted into an input signal by the input unit 43, and is inputted as voice.

The input unit 43 and the output unit 44 are consolidated outside the display area AA, with the same one side section SS1 of the four side sections LS1, LS2, SS1, and SS2 that define the quadrangular display area AA in the liquid crystal panel 11 where images are displayed being located between those units and the display area AA. Accordingly, the spaces outside the display area AA that have the other three side sections LS1, LS2, and SS2 located between those spaces and the display area AA are reduced in size. This makes it possible to ensure a broader display area AA in the display surface 11D of the liquid crystal panel 11, which is favorable in terms of narrowing the bezel. Additionally, disposing the input unit 43 and the output unit 44 outside the display area AA makes it difficult for those units to interfere with images displayed in the display area AA.

Additionally, the input unit 43 is a bone conduction sound input unit that converts input bone conduction sound transmitted through the cover panel 13 into an input signal. In the case where an air conduction sound input unit that converts input air conduction sound transmitted through outside air into an input signal is used as the input unit, it is necessary to provide an opening in the cover panel or the like for allowing the input air conduction sound to pass through. With respect to this point, using a bone conduction sound input unit for the input unit 43 eliminates the need to provide such an opening in the cover panel 13 or the like, which provides superior designability for the outer cover.

Additionally, the input unit (bone conduction sound input unit) 43 and the output unit 44 are both attached to the panel surface, of the cover panel 13, that is on the liquid crystal panel 11 side. As a result, input bone conduction sound transmitted through the cover panel 13 can be reliably converted into an input signal by the input unit 43 attached to the panel surface, of the cover panel 13, that is on the liquid crystal panel 11 side. The output unit 44 attached to the panel surface, of the cover panel 13, that is on the liquid crystal panel 11 side converts output signals into output bone conduction sound and causes the cover panel 13 to directly transmit that output bone conduction sound, which provides superior transmission efficiency. This makes it possible to reliably convert the input bone conduction sound into an input signal, and makes it possible to efficiently transmit output bone conduction sound, obtained by converting an output signal, to the user. As such, better voice call quality can be achieved.

Additionally, the device includes a liquid crystal panel flexible board 17 (connection component) 17 connected to an outer end portion of the liquid crystal panel 11, the liquid crystal panel flexible board 17 being disposed outside the display area AA such that the one side section SS1 included in the four side sections LS1, LS2, SS1, and SS2 defining the display area AA is located between the liquid crystal panel flexible board 17 and the display area AA. The input unit 43 and the output unit 44 are each disposed outside the display area AA such that the one side section SS1 included in the four side sections LS1, LS2, SS1, and SS2 defining the display area AA and located between the display area AA and the liquid crystal panel flexible board 17 is located between those units and the display area AA. As a result, the input unit 43 and the output unit 44 can be disposed using the space where the liquid crystal panel flexible board 17 is provided. In other words, the liquid crystal panel flexible board 17, the input unit 43, and the output unit 44 are disposed in a consolidated manner outside the display area AA. As such, the spaces outside the display area AA that have the three side sections LS1, LS2, and SS2, of the four side sections LS1, LS2, SS1, and SS2 defining the display area AA, located between those spaces and the display area AA, are reduced in size. This is favorable in terms of narrowing the bezel.

Additionally, the device includes the backlight device (illumination device) 12, the backlight device 12 being disposed on the side of the liquid crystal panel 11 opposite from the side where the cover panel 13 is located and irradiating the liquid crystal panel 11 with light, and including at least the following: the LED (light source) 19 disposed so as to be located outside the display area AA such that the one side section SS1 included in the four side sections LS1, LS2, SS1, and SS2 defining the display area AA is located between the LED 19 and the display area AA; and the light guide plate 21 that guides the light from the LED 19. The input unit 43 and the output unit 44 are disposed so as to be located outside the display area AA such that the one side section SS1 of the four side sections LS1, LS2, SS1, and SS2 defining the display area AA and located between the display area AA and the LED 19 is located between those units and the display area AA. As a result, the backlight device 12 uses the light guide plate 21 to guide light emitted from the LED 19 disposed outside the display area AA, so as to irradiate the liquid crystal panel 11 with that light. The liquid crystal panel 11 can display images in the display area AA using the light emitted from the backlight device 12. The input unit 43 and the output unit 44 are disposed using the space where the LED 19 of the backlight device 12 is provided. In other words, the LED 19, the input unit 43, and the output unit 44 are disposed in a consolidated manner outside the display area AA. As such, the spaces outside the display area AA that have the three side sections LS1, LS2, and SS2, of the four side sections LS1, LS2, SS1, and SS2 defining the display area AA, located between those spaces and the display area AA, are reduced in size. This is favorable in terms of narrowing the bezel.

Additionally, the light-shielding portion 13a is provided outside the display area AA on the panel surface, of the cover panel 13, on the liquid crystal panel 11 side. As a result, the light-shielding portion 13a makes it difficult for the user to see the input unit 43 and the output unit 44 disposed outside the display area AA such that the one side section SS1 included in the four side sections LS1, LS2, SS1, and SS2 defining the display area AA is located between those units and the display area AA. This provides a high display quality.

Finally, the touch panel pattern 26 for detecting the position of an input made by the user is provided on the panel surface, of the cover panel 13, on the liquid crystal panel 11 side. As a result, the number of components can be reduced as compared to a case where a touch panel having a touch panel pattern is provided separate from the cover panel. This makes it possible to reduce manufacturing costs.

Embodiment 2

Embodiment 2 of the present invention will be described with reference to FIG. 9. Embodiment 2 describes a configuration that includes an output separating unit 47 and an output signal correcting unit 48. Note that redundant descriptions of structures, operations, and effects identical to those in the above-described Embodiment 1 will be omitted.

Figure 9:
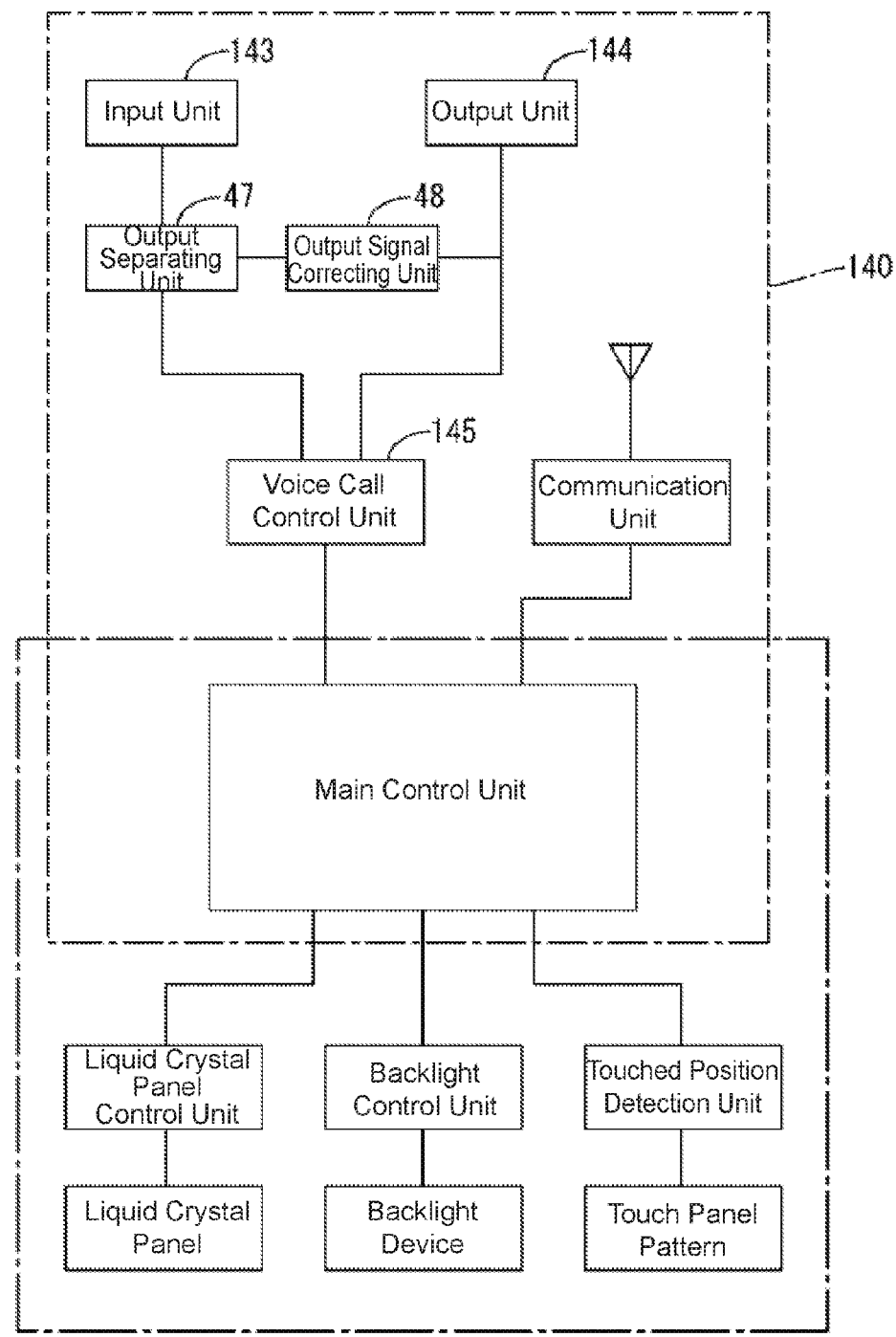
FIG. 9 is a block diagram illustrating the electrical configurations of a liquid crystal display device and an audio/data communication unit according to Embodiment 2 of the present invention.

As illustrated in FIG. 9, an audio/data communication unit 140 according to the present embodiment includes: the output separating unit 47, which finds a difference between an input signal obtained by conversion performed by an input unit 143 and an output signal, and obtains an output separated input signal based on an input bone conduction sound from which an output bone conduction sound has been separated; and the output signal correcting unit 48, which supplies, to the output separating unit 47, a corrected output signal from which the effects of attenuation arising when the output bone conduction sound is transmitted through the cover panel (not illustrated) have been eliminated.

The output signal correcting unit 48 corrects the output signal supplied from a voice call control unit 145 to an output unit 144, and during this correction, generates the corrected output signal by multiplying the stated output signal by a prescribed correction coefficient. The correction coefficient is the inverse of an attenuation factor of the attenuation arising during the process of the bone conduction sound being transmitted through the cover panel, and is a unique numerical value based on conditions such as the material (rigidity, elastic modulus, and so on) and the size of the cover panel. The corrected output signal generated by the output signal correcting unit 48 is a signal obtained by eliminating the effects of attenuation arising when the output bone conduction sound is transmitted through the cover panel from the original corrected output signal, and is based on the substantial output bone conduction sound transmitted through the cover panel.

The output separating unit 47 is constituted by a differential amplifier, and can find a difference between the input signal and the output signal (the corrected output signal) and amplify that difference. Specifically, the output separating unit 47 finds a difference between the input signal obtained by the input unit 143 converting the bone conduction sound transmitted through the cover panel and the above-described corrected output signal supplied from the output signal correcting unit 48, and sends a signal in which that difference is amplified to the voice call control unit 145. Here, there are cases where the input bone conduction sound and the output bone conduction sound are transmitted through the cover panel simultaneously, and in such a case, the input unit 143 will convert mixed sound of the input bone conduction sound and the output bone conduction sound into the input signal. Even in such a case, by subtracting the output signal (the corrected output signal) from the input signal, the output separating unit 47 can obtain the output separated input signal based on the input bone conduction sound from which the output bone conduction sound has been separated. The output signal used when obtaining this difference is the corrected output signal supplied from the output signal correcting unit 48, and thus the net output bone conduction sound actually transmitted through the cover panel can be subtracted from the mixed sound, which makes it possible to reliably extract the input bone conduction sound. As a result, the user's voice can be transmitted to the call partner in a clearer state, which makes it possible to even further improve the voice call quality. Note that in the case where only the input bone conduction sound is transmitted through the cover panel and the output bone conduction sound is not mixed therewith, there is no output signal, and thus the output separating unit 47 sends the input signal as-is to the voice call control unit 145.

According to the present embodiment as described thus far, the output separating unit 47, which finds the difference between the input signal obtained from the conversion performed by the input unit 143 and the output signal, and obtains the output separated input signal based on the input bone conduction sound from which the output bone conduction sound has been separated, is provided. For example, in the case where the output bone conduction sound and the input bone conduction sound are transmitted through the cover panel simultaneously, the input signal obtained from the conversion performed by the input unit 143 will contain the input bone conduction sound and the output bone conduction sound in a mixed state. Even in this case, by finding the difference between that input signal and the output signal, the output separating unit 47 obtains the output separated input signal based on the input bone conduction sound from which the output bone conduction sound has been separated. This makes it possible to reliably extract the input bone conduction sound from the mixed sound and obtain clear voice input.

Additionally, the output signal correcting unit 48, which calculates the corrected output signal by taking the inverse of the attenuation factor of the attenuation arising when the output bone conduction sound is transmitted through the cover panel as a correction coefficient and multiplying the output signal by that correction coefficient, is provided. The output separating unit 47 obtains the output separated input signal by finding the difference between the input signal and the corrected output signal. There are cases where attenuation arises when the output bone conduction sound is transmitted through the cover panel, and the output signal correcting unit 48 can calculate the corrected output signal based on the substantial output bone conduction sound from which that attenuation has been eliminated. The corrected output signal calculated by the output signal correcting unit 48 is used when the output separating unit 47 finds the difference from the input signal, and thus the substantial output bone conduction sound can be reliably removed from the mixed sound by the output separating unit 47. This makes it possible to obtain an even clearer voice input.

Additionally, the output separating unit 47 is constituted by a differential amplifier that finds a difference between the input signal and the output signal and amplifies that difference. As a result, by finding the difference between the input signal and the output signal and amplifying that difference using the differential amplifier serving as the output separating unit 47, clearer voice input can be obtained.

Embodiment 3

Embodiment 3 of the present invention will be described with reference to FIG. 10 or 11. Embodiment 3 is different from the above-described Embodiment 1 such that an input unit 243 is an air conduction type. Note that redundant descriptions of structures, operations, and effects identical to those in the above-described Embodiment 1 will be omitted.

Figure 10:
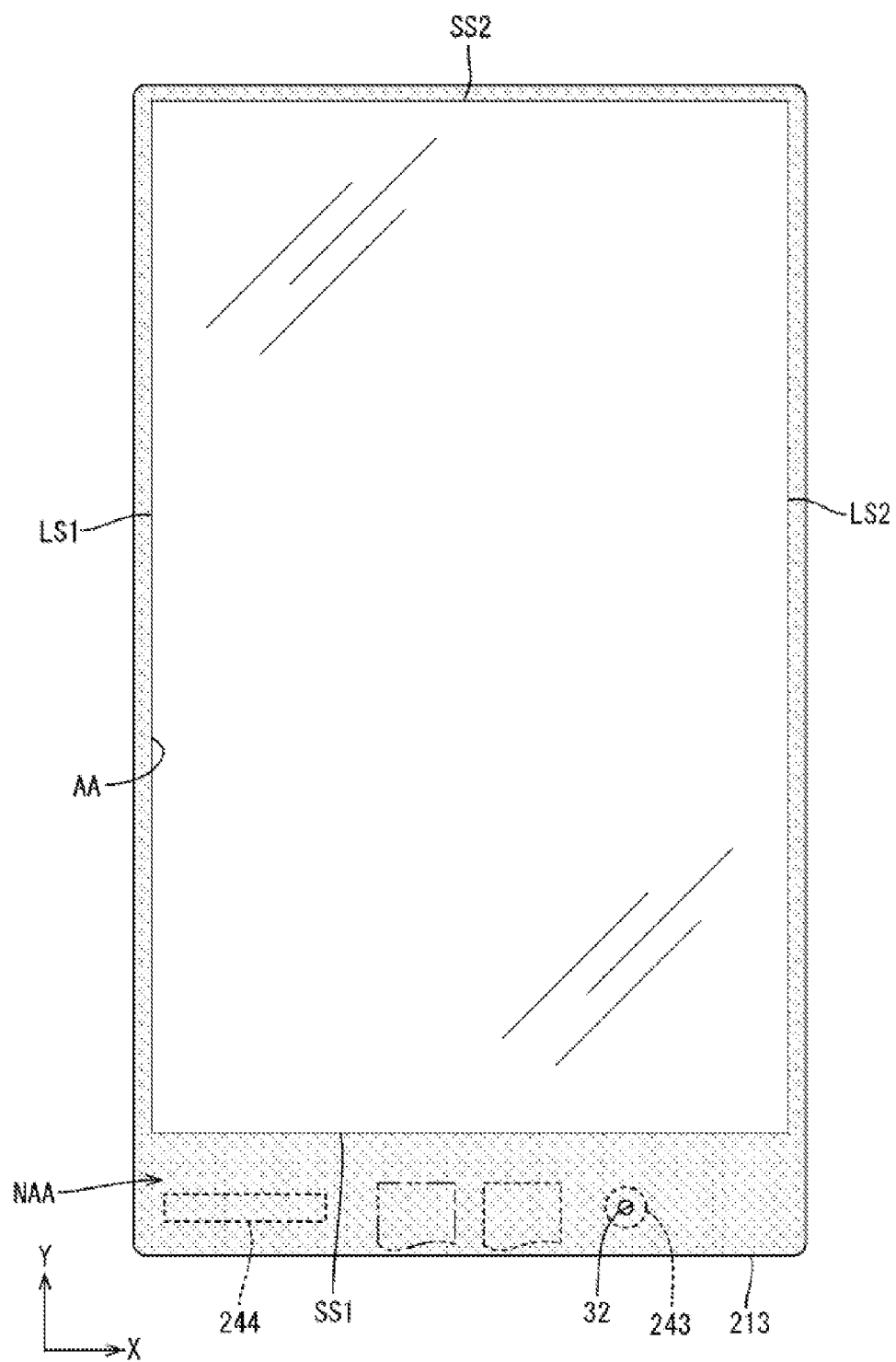
FIG. 10 is a plan view of a cover panel according to Embodiment 3 of the present invention.
Figure 11:
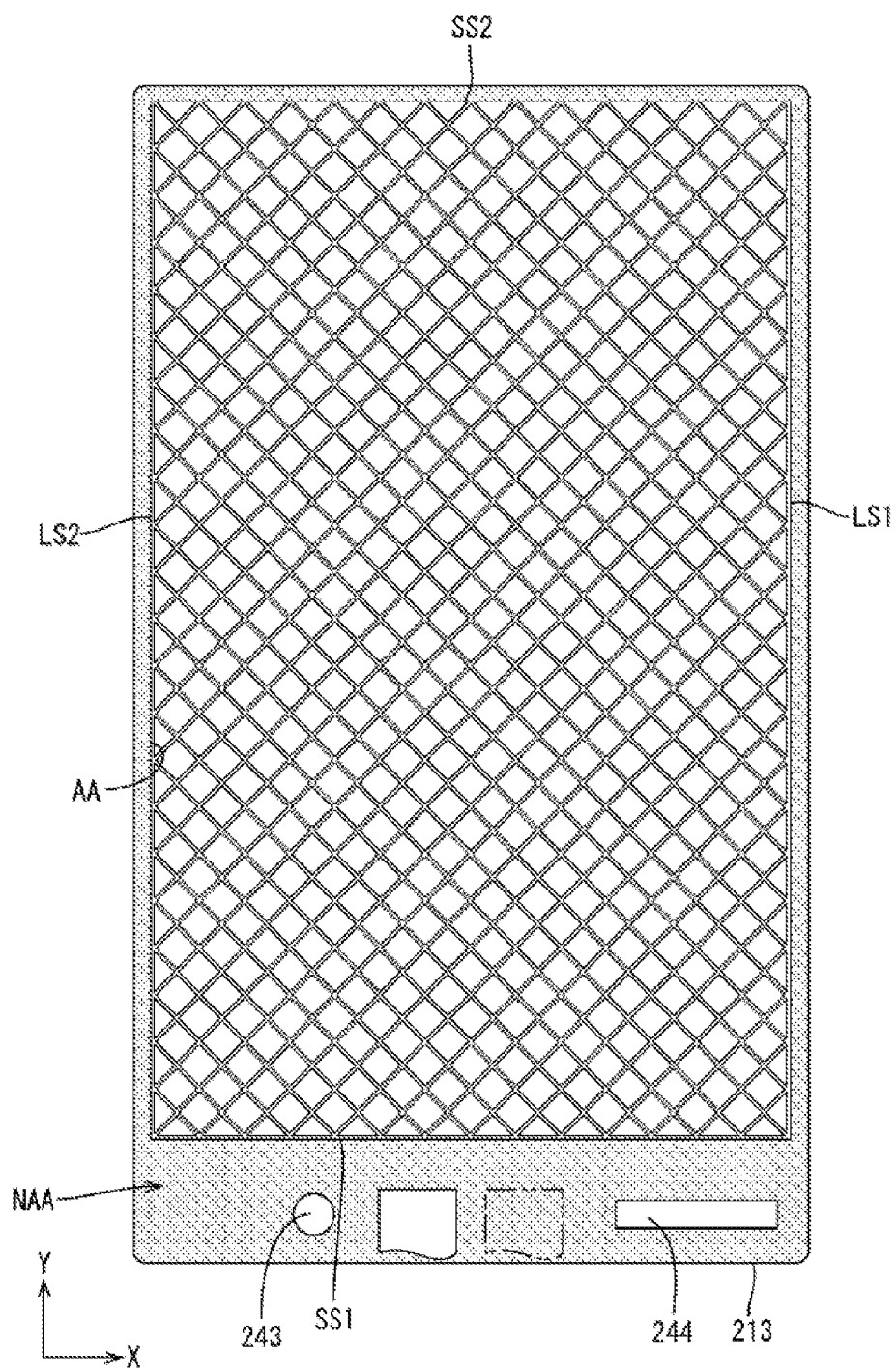
FIG. 11 is a bottom view of the cover panel.

As illustrated in FIGS. 10 and 11, the input unit (air conduction sound input unit) 243 according to the present embodiment converts input air conduction sound transmitted through outside air into an input signal. This input unit 243 is constituted by a microphone (a piezoelectric microphone, a condenser microphone, or the like) that converts voice, which is input air conduction sound emitted from the user's vocal cords and transmitted through the outside air, into an input signal. An opening 32 is provided in a cover panel 213, in a part where the input unit 243 is attached (a part overlapping the input unit 243 when viewed in plan view), so as to pass through the cover panel 213 in the thickness direction. The input unit 243 is directly exposed to the outside air through the opening 32, and thus the input air conduction sound can be transmitted to the input unit 243 efficiently. A diameter dimension of the opening 32 is significantly smaller than an outer dimension of the input unit 243.

When viewed in plan view, the input unit 243 and an output unit 244 are disposed so as to be located outside the display area AA (within the non-display area NAA), with, of the side sections LS1, LS2, SS1, and SS2 defining the display area AA in the liquid crystal panel (not illustrated), the short side SS1 on the lower side in the vertical direction is located between those units and the display area AA. According to such an arrangement, the input unit 243 is located near the user's mouth when the user uses the smartphone (the entirety of which is not illustrated), which makes it possible for the input unit 243 to more reliably convert the user's voice into the input signal (see FIG. 8).

According to the present embodiment as described thus far, the input unit 243 is an air conduction sound input unit that converts the input air conduction sound transmitted through the outside air into an input signal; and the input unit 243 and the output unit 244 are disposed outside the display area AA such that of the four side sections LS1, LS2, SS1, and SS2 defining the display area AA, the one side section SS1 on the lower side in the vertical direction is located between those units and the display area AA. As a result, voice or the like produced by the user is transmitted through the outside air as the input air conduction sound and is converted into the input signal by the input unit 243, thus achieving input of that voice or the like. The input unit 243 is, along with the output unit 244, disposed outside the display area AA such that of the four side sections LS1, LS2, SS1, and SS2 defining the display area AA, the one side section SS1 on the lower side in the vertical direction is located between those units and the display area AA. As such, the input unit 243 is located close to the user's mouth when the user uses the smartphone, and thus the user's voice or the like can be more reliably converted into an input signal.

Other Embodiments

The present invention is not limited to the embodiments described above and illustrated in the drawings. For example, embodiments such as those described below also fall within the technical scope of the present invention.

(1) The above-described embodiments describe the input unit and the output unit as being consolidated in a part of the smartphone on the lower side in the vertical direction. However, the input unit and the output unit can also be consolidated in a part of the smartphone on the upper side in the vertical direction. In other words, when viewed in plan view, the input unit and the output unit may be disposed outside the display area such that of the side sections defining the display area in the liquid crystal panel, a side section on the upper side in the vertical direction (a short side section) is located between those units and the display area. Alternatively, when viewed in plan view, the input unit and the output unit may be disposed outside the display area such that of the side sections defining the display area in the liquid crystal panel, one side section in the horizontal direction (a long side section) is located between those units and the display area.

(2) The above-described embodiments describe a case where the input unit, the output unit, and the liquid crystal panel flexible board are disposed in a consolidated manner. However, the input unit, the output unit and the liquid crystal panel flexible board may be disposed in an unconsolidated manner. Specifically, the configuration may be such that the input unit and the output unit are disposed so as to be located outside the display area, with a side section, included in the side sections that define the display area in the liquid crystal panel, that is different from a side section located between the display area and the liquid crystal panel flexible board located between those units and the display area.

(3) The above-described embodiments describe a case where the input unit and output unit and the LEDs are disposed in a consolidated manner. However, the input unit and output unit and the LEDs may be disposed in an unconsolidated manner. Specifically, the configuration may be such that the input unit and the output unit are disposed so as to be located outside the display area, with a side section, included in the side sections that define the display area in the liquid crystal panel, that is different from a side section located between the display area and the LEDs located between those units and the display area.

(4) As a variation on the above-described Embodiment 2, the output signal correcting unit may be omitted. In this case, the output separating unit generates the output separated signal by finding a difference between the output signal (uncorrected output signal) supplied from the voice call control unit to the output unit, and the input signal. Depending on the material, size, and so on of the cover panel, there are cases where an extremely low degree of attenuation arises when the output bone conduction sound is transmitted through the cover panel, and it is particularly preferable that the output signal correcting unit be omitted in such cases as described above.

(5) The above-described Embodiment 3 describes a case where the input unit is attached to the cover panel and an opening is provided in the cover panel. However, it is also possible to attach the input unit to another member and provide the opening in the other member. For example, the input unit may be attached to the casing and the opening may be provided in the casing. As a result, the cover panel can be kept in a state without having an opening therein. This also makes it possible to have the member to which the input unit is attached and the member in which the opening is provided be different members.

(6) In addition to the above-described embodiments, the arrangement of the input unit and the output unit in the cover panel when viewed in plan view can be changed as desired. For example, one or both of the input unit and the output unit may be disposed in a central area of the short side direction of the cover panel (the direction following the one side section).

(7) The above-described embodiments describe one each of the input unit and the output unit being provided. However, a plurality of one or both of the input unit and the output unit can also be provided. In this case, for example, a bone conduction sound output unit that converts an output signal into output bone conduction sound and an air conduction sound output unit that converts the output signal into output air conduction sound can be provided as output units.

(8) The above-described embodiments describe the control board as having the communication unit and the voice call control unit. However, a voice call control board may be provided separate from the control board, and voice calls may be controlled by providing the communication unit and the voice call control unit on that voice call control board. In this case, it is preferable that a main control unit dedicated to the voice call function be provided in the voice call control board, separate from the main control unit of the control board.

(9) The above-described embodiments describe the control board as having the touched position detection unit. However, a touch panel control board may be provided separate from the control board, and the position of the touch panel pattern that has been touched may be detected by providing the touched position detection unit in that touch panel control board.

(10) The above-described embodiments describe the control board as having the backlight control unit. However, an LED driving board may be provided separate from the control board, and power for driving the LEDs may be supplied by providing the backlight control unit in that LED driving board.

(11) The above-described embodiments describe a case where strengthened glass subjected to a chemical strengthening process is used as the cover panel. However, strengthened glass subjected to an air-cooling strengthening process (a physical strengthening process) can of course be used.

(12) The above-described embodiments describe strengthened glass as being used as the cover panel. However, a normal glass material that is not strengthened glass (that is, unstrengthened glass), a synthetic resin material, or the like can of course be used.

(13) The above-described embodiments describe a case where a liquid crystal panel having a vertically-elongated rectangular display area is used. However, a liquid crystal panel having a horizontally-elongated display area, a liquid crystal panel having a square display area, or the like can be used as well.

(14) The above-described embodiments describe a smartphone whose primary function is a data communication function as an example. However, the present invention can also be applied in a phablet terminal, a tablet terminal, or the like having a larger screen size. Additionally, the present invention can also be applied in a featurephone whose primary function is a voice call function, and in such a case, the touch panel pattern (touch panel function) can be omitted.

(15) The above-described embodiments describe an example in which the colored parts of the color filters in the liquid crystal panel are three colors, namely R, G, and B. However, it is also possible for the colored parts to have four or more colors.

(16) The above-described embodiments describe an example in which LEDs are used as the light sources of the backlight device. However, another light source such as organic EL elements can be used as well.

(17) The above-described embodiments describe an example in which the backlight device provided in the liquid crystal display device is an edge-lit type. However, using a direct-lit backlight device also falls within the scope of the present invention.

(18) The above-described embodiments describe a case where a transmissive liquid crystal display device including a backlight device as an external light source is used as an example. However, the present invention can also be applied in the case where a reflective liquid crystal display device that displays using exterior light is used, and in that case, the backlight device can be omitted.

(19) The above-described embodiments describe a case where a liquid crystal display device using a liquid crystal panel is used as the display component as an example. However, the present invention can also be applied in the case of using a display device including another type of display panel (a plasma display panel (PDP), an organic EL panel, or the like). In this case, the backlight device can be omitted.

(20) In the above-described embodiments, TFTs are used as the switching elements of the liquid crystal display device. However, the present invention can also be applied in the case of using a liquid crystal display device that uses switching elements aside from TFTs (thin-film diodes (TFDs), for example). Additionally, instead of a color liquid crystal display device, the present invention can also be applied in the case of using a black-and-white liquid crystal display device.

DESCRIPTION OF REFERENCE CHARACTERS 11 liquid crystal panel (display component)
11D display surface
12 backlight device (illumination device)
13, 213 cover panel (outer panel)
13a light-shielding portion
17 liquid crystal panel flexible board (connection component)
19 LED (light source)
21 light guide plate
26 touch panel pattern
43, 143 input unit (bone conduction sound input unit)
44, 144, 244 output unit (bone conduction sound output unit)
47 output separating unit
48 output signal correcting unit
243 input unit (air conduction sound input unit)
AA display area
LS1, LS2 long side section (side section)
SS1 short side section (side section, one side section)
SS2 short side section (side section)
SMP smartphone (audio transmission device with a display function)

What is claimed is:

1. An audio transmission device with a display function, the device comprising:
a display component having a display surface in which is defined a quadrangular display area where an image is displayed;
an outer panel disposed so as to cover said display surface of said display component;
a bone conduction sound input unit disposed outside said display area, said bone conduction sound input unit receiving and converting input bone conduction sound transmitted through said outer panel into an input signal;
a bone conduction sound output unit disposed outside said display area on a same side as the bone conduction sound input unit among four sides surrounding the display area, said bone conduction sound output unit converting an output signal and transmitting the output signal as output bone conduction sound to said outer panel,
an output separating unit that obtains an output separated input signal based on said input bone conduction sound from which said output bone conduction sound has been separated, by finding a difference between said input signal obtained by the conversion performed by said bone conduction sound input unit and said output signal, and an output signal correcting unit that calculates a corrected output signal by multiplying said output signal by a correction coefficient, said correction coefficient being an inverse of an attenuation factor of attenuation arising when said output bone conduction sound is transmitted through said outer panel, wherein said output separating unit obtains said output separated input signal by finding a difference between said input signal and said corrected output signal.

2. The audio transmission device with the display function according to claim 1, wherein said output separating unit is constituted by a differential amplifier that finds a difference between said input signal and said output signal and amplifies said difference.

3. The audio transmission device with the display function according to claim 1, wherein said bone conduction sound input unit and said bone conduction sound output unit are each attached to a panel surface, of said outer panel, that faces said display component.

4. The audio transmission device with the display function according to claim 1, further comprising:

a connection component connected to an outer end portion of said display component, said connection component being disposed on the same side as the input unit and the output unit.

5. The audio transmission device with the display function according to claim 1, further comprising:

an illumination device disposed on a rear side of said display component opposite from a front side where said outer panel is located and irradiating said display component with light, said illumination device including at least a light source disposed on the same side as the input unit and the output unit in a plan view, and a light guide plate that guides light from said light source.

6. The audio transmission device with the display function according to claim 1, wherein a light-shielding portion is provided on a panel surface, of said outer panel, on said display component side, and outside said display area.

7. The audio transmission device with the display function according to claim 1, wherein a touch panel pattern for detecting a position of an input made by a user is provided on a panel surface, of said outer panel, on said display component side.

* * * * *